US012737284B2

(12) United States Patent
Williams et al.

(10) Patent No.: US 12,737,284 B2
(45) Date of Patent: Sep. 15, 2026

(54) DETECTING ANALYSIS MODEL COMPATIBILITIES WITH COMPLEX EXPERIMENT DESIGNS TO GENERATE EXPERIMENT DESIGN AND ANALYSIS MODEL COMPATIBILITY GRAPHICAL USER INTERFACES

(71) Applicant: Recursion Pharmaceuticals, Inc., Salt Lake City, UT (US)

(72) Inventors: Anthus John Williams, Salt Lake City, UT (US); James Thomas Brisette, Salt Lake City, UT (US); Kristen Rose Morse, Cottonwood Heights, UT (US); Khanh Ly Thi Nguyen, Salt Lake City, UT (US); Matthew Lowry McKeithen, Salt Lake City, UT (US); Nicholas Cernek, Knoxville, TN (US); Scott Michael Nielsen, South Jordan, UT (US); Shweta Deepchand Bhandare, Boulder, CO (US); Tatjana Sophie Kanashiro, Salt Lake City, UT (US)

(73) Assignee: Recursion Pharmaceuticals, Inc., Salt Lake City, UT (US)

( * ) Notice: Subject to any disclaimer, the term of this patent is extended or adjusted under 35 U.S.C. 154(b) by 172 days.

(21) Appl. No.: 18/390,989

(22) Filed: Dec. 20, 2023

(65) Prior Publication Data

US 2025/0208980 A1 Jun. 26, 2025

(51) Int. Cl.
*G06F 11/3668* (2025.01)
*G06F 8/38* (2018.01)

(52) U.S. Cl.
CPC ........... *G06F 11/3676* (2013.01); *G06F 8/38* (2013.01); *G06F 11/3692* (2013.01)

(58) Field of Classification Search
CPC .... G06F 11/3626; G06F 11/3692; G06F 8/34; G06F 8/38
See application file for complete search history.

(56) References Cited

U.S. PATENT DOCUMENTS 10,489,541 B1 * 11/2019 Patra .................... G06F 30/327
11,695,993 B1 * 7/2023 Matthews ........ H04N 21/26283 725/43

(Continued)

FOREIGN PATENT DOCUMENTS

CN 102124445 A * 7/2011 ............... G06F 8/38
CN 115080424 A * 9/2022 .......... G06F 11/3688

OTHER PUBLICATIONS

"Method and System for Creating HMI Applications for an Automation Process" (Year: 2011).*

(Continued)

*Primary Examiner* — Ziaul A Chowdhury
(74) *Attorney, Agent, or Firm* — Keller Preece PLLC

(57) ABSTRACT

The present disclosure relates to systems, non-transitory computer-readable media, and methods for generating and displaying compatibility metrics between experiment designs and data analysis models. For example, the disclosed systems can display an experiment design user interface that enables user selections of a modular experiment design and data analysis models for the experiment design. Furthermore, the disclosed systems can extract (or identify) one or more analysis code validation components from data analysis models that detect design errors (e.g., incompatibilities) between selected data analysis models and the experiment design. Additionally, the disclosed systems can compare the one or more analysis code validation components to the experiment design to detect compatibilities between the selected data analysis models with the experiment design. Moreover, the disclosed systems can also (Continued)

display, within graphical user interfaces, the detected compatibilities between selected data analysis models and the experiment design during scheduling of the modular experiment design.

20 Claims, 11 Drawing Sheets

(56) References Cited

U.S. PATENT DOCUMENTS

2008/0300832 A1* 12/2008 Ueda ........................ G06F 30/00
703/1
2022/0129789 A1* 4/2022 Zhang .................... G06N 20/00
2025/0156384 A1* 5/2025 Rajagopalan ........... H04L 51/02
2025/0190983 A1* 6/2025 Saini ................ G06Q 10/06393

OTHER PUBLICATIONS

"Method and Device for Testing Service Instance", Inventor: Ke-fei Zhang, [English Translation of CN 115080424 A], Publication date:Sep. 20, 2022 (Year: 2022).*

* cited by examiner

Client Device(s) 110
Network
108
Testing Device(s) 112
Server(s) 102
Tech-Bio Exploration System 104
Experiment Design Interface
System 106

DETECTING ANALYSIS MODEL COMPATIBILITIES WITH COMPLEX EXPERIMENT DESIGNS TO GENERATE EXPERIMENT DESIGN AND ANALYSIS MODEL COMPATIBILITY GRAPHICAL USER INTERFACES

BACKGROUND

Recent years have seen significant developments in hardware and software platforms for utilizing computing devices and experiment testing devices to orchestrate complex experiment designs. For example, existing systems often utilize a variety of computing devices, experiment testing devices, experiment processes, and computer-based models (e.g., feature extraction models, analysis models) to orchestrate complex experiment designs that extract and analyze digital signals corresponding to various biological and/or chemical relationships. Indeed, in one or more instances, existing systems also utilize a variety of user interfaces to receive user selections for various computing devices, experiment testing devices, experiment processes, and computer-models to build and execute complex experiment designs. Although existing systems can build, orchestrate, and execute complex experiment designs, conventional systems have a number of technical deficiencies with regard to operational inflexibility, inaccuracy, and inefficiency in generating and executing complex experiment designs from various selections of computing devices, experiment testing devices, experiment processes, and computer-based models.

SUMMARY

Embodiments of the present disclosure provide benefits and/or solve one or more of the foregoing or other problems in the art with systems, non-transitory computer-readable media, and computer-implemented methods for generating and displaying compatibility metrics between complex experiment designs and data analysis models while building the complex experiment design via user selections in an experiment design user interface. For example, the disclosed systems can display an experiment design user interface that enables user selections of modular experiment process configurations, such as computing devices, experiment testing devices, feature extraction models, and data analysis models to generate an experiment design. Furthermore, the disclosed systems can extract (or identify) one or more analysis code validation components from data analysis models that detect design errors (e.g., incompatibilities) between selected data analysis models and the experiment design. Additionally, the disclosed systems can compare the one or more analysis code validation components to the experiment design to detect compatibilities between the selected data analysis models with the experiment design. Moreover, the disclosed systems can also display, within graphical user interfaces, the detected compatibilities to enable efficient and accurate detection of compatibility between selected data analysis models and the experiment design during scheduling of the modular experiment design to prevent execution of an incompatible (and/or inoperable) experiment design.

Additional features and advantages of one or more embodiments of the present disclosure are outlined in the description which follows, and in part can be determined from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
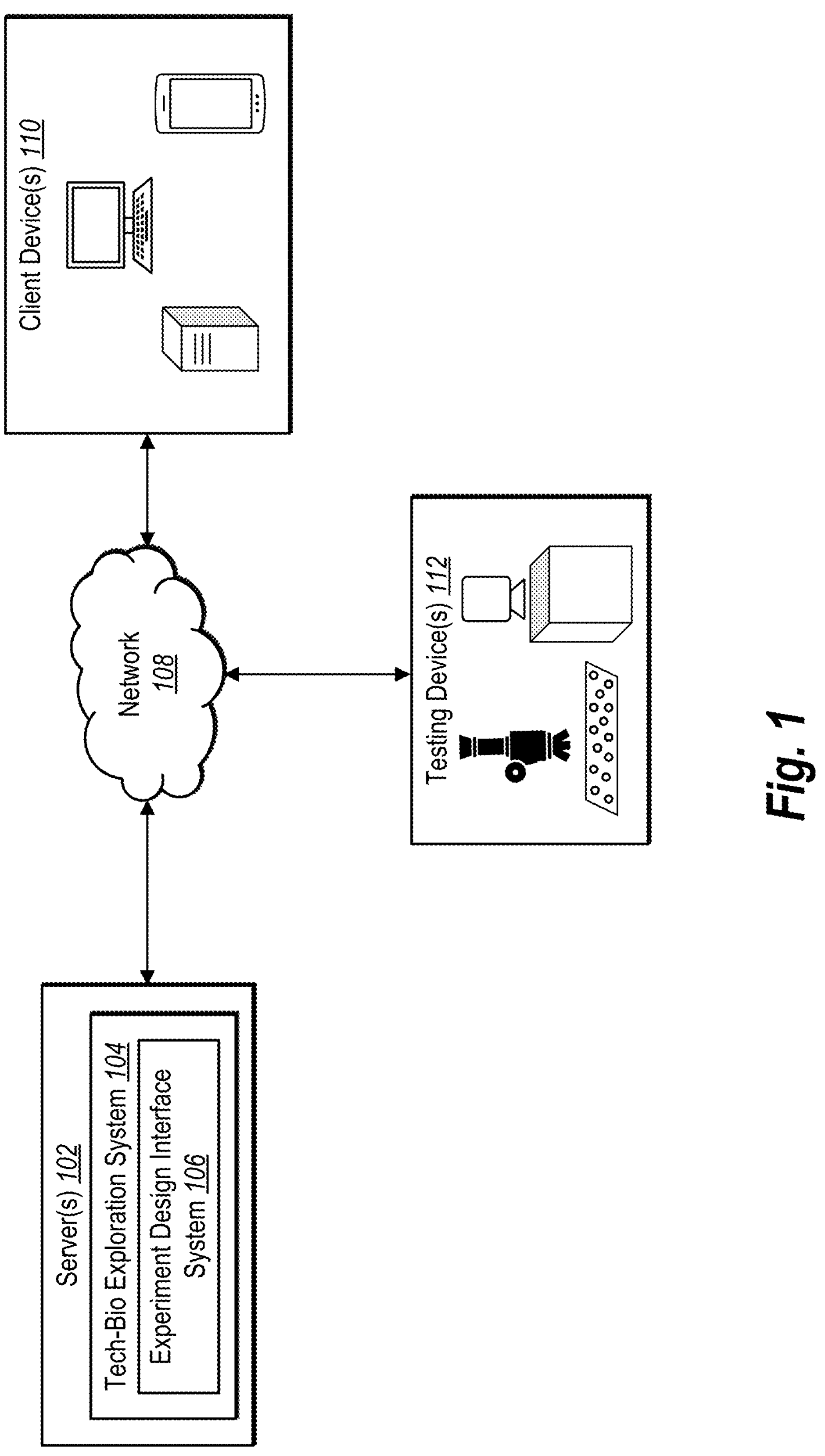
FIG. 1 illustrates a schematic diagram of a system environment in which an experiment design interface system can operate in accordance with one or more embodiments.

This disclosure describes one or more embodiments of an experiment design interface system that generates graphical user interfaces to display detected compatibilities between complex experiment designs and data analysis models selected via user selections in an experiment design user interface. In particular, the experiment design interface system can receive user interactions with an experiment design user interface to identify an experiment design that includes a modular selection of experiment process components and a data analysis model. Furthermore, the experiment design interface system can extract one or more analysis code validation components from the data analysis model (e.g., via an analysis code validation representation). Moreover, the experiment design interface system can utilize comparisons between conditions within the one or more analysis code validation components and the experiment process components to determine whether the experiment design fits (or is compatible) with the selected data analysis model. Indeed, the experiment design interface system can display a graphical user interface to indicate one or more compatibility metrics between the data analysis model relative to the experiment design.

In one or more implementations, the experiment design interface system displays an experiment design user interface that enables user selection of various modular experiment design components (e.g., computing devices, experiment testing devices, experiment processes, feature extraction models, data analysis models) to generate an experiment process. For example, the experiment design interface system can provide, for display via the experiment design user interface, experiment design elements and data analysis model selection elements. Indeed, the experiment design interface system can receive (or identify) one or more experiment process components as configurations for an experiment process (e.g., experiment metadata, assay configurations, compound selections, controls, data models, feature extraction models) for an experiment design (e.g., to detect various biological and/or chemical relationships). In addition, the experiment design interface system can also receive one or more data analysis model selections indicating data analysis models to utilize with to process (or analyze) data outputs from the selected experiment process configurations. Indeed, the experiment design interface system can utilize the selected experiment process components and selected data analysis model(s) to generate an experiment design.

Furthermore, in one or more implementations, the experiment design interface system utilizes data analysis models that include one or more analysis code validation components. For instance, the experiment design interface system can identify (or extract) an analysis code validation component from a data analysis model that represents various (logic) conditions that should exist in an experiment design to satisfy the operability (or compatibility) of the data analysis model. In one or more instances, the experiment design interface system enables creation of an analysis code validation component with a data analysis model via user selections and/or user provided source code for the data analysis model.

In some cases, the experiment design interface system generates an analysis code validation representation from the data analysis model. In particular, experiment design interface system can extract various components represented in a code (e.g., source code) corresponding to the data analysis model to generate an analysis code validation representation having nodes and node dependencies representing one or more of the components (e.g., analysis model tasks, analysis code validation components, relational edges) from the data analysis model (or data analysis model source code). In some cases, the experiment design interface system generates a directed acyclic graph with nodes representing analysis model tasks, analysis code validation components, and edges representing dependencies between analysis model tasks.

Furthermore, the experiment design interface system can generate compatibility metrics to determine whether the experiment design fits (or is compatible) with the selected data analysis model(s). For instance, the experiment design interface system can compare experiment process components in the experiment design to the analysis code validation components (or the analysis code validation representation) to generate the compatibility metrics. Indeed, the experiment design interface system can determine whether the experiment process components in the experiment design satisfy one or more conditions imposed by the analysis code validation components.

Indeed, if the experiment process components satisfy the imposed conditions of the analysis code validation components, the experiment design interface system generates a positive compatibility metric indicating that the experiment process fits (or is compatible) with the selected data analysis model. In some cases, if the experiment process components do not satisfy one or more of the imposed conditions of the analysis code validation components, the experiment design interface system generate a negative compatibility metric indicating that the experiment process does not fit (or is not compatible) with the selected data analysis model. In some cases, the experiment design interface system can utilize the analysis code validation representation to determine portions of the data analysis model that are compatible (and useable) with a selected experiment design.

Additionally, in one or more embodiments, the experiment design interface system can display a compatibility graphical user interface that indicates the compatibility of a selected data analysis model with a selected experiment design. For instance, the experiment design interface system can display one or more compatibility elements that indicate determined compatibility metrics (positive and/or negative compatibility) of one or more data analysis models relative to a selected experiment design. Additionally, the experiment design interface system can also utilize the analysis code validation components to display one or more descriptors indicating a reason for incompatibility through one or more conditions of the analysis code validation components.

In some cases, the experiment design interface system displays the compatibility graphical user interface that indicates the compatibility of the selected data analysis model with the selected experiment design as an indication of possible errors between the data analysis model and the selected experiment design. In some instances, the experiment design interface system further provides one or more user interface elements to modify the experiment design in response to the detected compatibility metrics. Indeed, the experiment design interface system can receive one or more modifications to the experiment design to satisfy the analysis code validation components of the data analysis models. In some cases, the experiment design interface system can also receive a selection of another data analysis model to resolve compatibility issues between data analysis models and the selected experiment design. Indeed, the experiment design interface system can also enable the execution of the experiment design.

In one or more instances, the experiment design interface system facilitates user selections of one or more experiment process components and/or data analysis model components to generate modular experiment designs. In particular, the experiment design interface system can enable a user selection of various combinations of experiment process components. Furthermore, the experiment design interface system can also enable a user selection of various combinations of data analysis models that include analysis code validation components. Indeed, the experiment design interface system can efficiently and accurately utilize the analysis code validation components to determine a compatibility between the various combinations of experiment process components and the various combinations of data analysis models in an experiment design (prior to executing the experiment design).

Additionally, in one or more implementations, the experiment design interface system also utilizes the analysis code validation components to determine compatibilities between the various combinations of experiment process components and the various combinations of data analysis models during execution of an experiment design. For instance, the experiment design interface system can utilize the analysis code validation components (in accordance with one or more implementations herein) to flag compatibilities (and/or incorrect executions) during (or after) an execution of an experiment design (e.g., to check an actual performance of an experiment design during run time). Indeed, the experiment design interface system can display determined compatibilities (or incompatibilities) after execution (or runtime) of an experiment design to indicate one or more faults and/or errors after execution of an experiment design.

As mentioned above, although conventional systems can build, orchestrate, and execute complex experiment designs, such systems have a number of problems in relation to flexibility, accuracy, and efficiency of operation. For example, many conventional systems inaccurately map (or utilize) data analysis models in complex experiment designs. In particular, conventional systems are often unable to accurately determine whether a complex experiment design having various experiment process components (e.g., a variety of computing devices, experiment testing devices, experiment processes, feature extraction models, data analysis models) will execute properly. Indeed, because varying experiment process components in an experiment design often result in inaccurate utilization with data analysis models, many conventional systems result in inaccurate and unpredictable compatibilities between data analysis models in experiment designs and other experiment process components in the experiment designs.

In many cases, to resolve the inaccuracies and erratic behavior of complex experiment designs, conventional systems provide (or facilitate) inflexible user interfaces for generating experiment designs. In particular, many conventional systems provide rigid interfaces that limit the customizability of experiment design selections to avoid inaccurate and/or erratic outcomes from interactions between data analysis models in experiment designs and other experiment process components in the experiment designs. For instance, oftentimes, conventional systems generate user interfaces that are limited to known combinations of experiment processes and data analysis models. Accordingly, oftentimes, such conventional systems cannot facilitate flexible user interfaces that enable customized selections of experiment process components and data analysis models.

In addition to being inflexible, many conventional experiment design systems are also inefficient. More specifically, complex experiment designs having various experiment process components (e.g., a variety of computing devices, experiment testing devices, experiment processes, feature extraction models, data analysis models) often require substantial computational resources. In many instances, due to the inaccuracies and erratic behavior of complex experiment designs, many conventional systems often inefficiently utilize computational resources to execute experiment designs that result in errors or undesirable (e.g., unusable) outcomes. As such, conventional systems often require an inefficient brute force approach in which various experiment designs are created and executed and, upon failure, modified and executed iteratively until a desirable outcome is achieved from the experiment design. The time, number of user interactions, number of experiment design executions, and number of user interfaces required to identify errors in experiment designs in conventional systems wastes significant computing resources (e.g., memory and processing power).

As suggested by the foregoing, the experiment design interface system provides a variety of technical advantages relative to conventional systems. For instance, by utilizing analysis code validation components within data analysis models, the experiment design interface system can accurately determine compatibilities between various combinations of experiment process components and one or more data analysis models. Unlike conventional systems that are unable to accurately predict whether a complex combination of experiment process components will execute correctly, the experiment design interface system can utilize comparisons between conditions within the one or more analysis code validation components and the experiment process components to determine whether an experiment design (having a complex combination of experiment process components) fits (or is compatible) with one or more selected data analysis models. Indeed, the experiment design interface system can utilize analysis code validation components corresponding to data analysis models to accurately determine compatibilities between multiple selected data analysis models for various combinations of experiment process components.

Additionally, by accurately determining compatibilities between data analysis models and various combinations of experiment process components, the experiment design interface system also improves flexibility relative to conventional systems. For instance, in contrast to the rigid interfaces that limit the customizability of experiment design selections in many conventional systems, the experiment design interface system provides flexible user interfaces that facilitate the creation of fully customizable experiment designs. In particular, by having the ability to (immediately) detect compatibilities between selected data analysis models and other experiment process components, the experiment design interface system can display user interfaces that enable easy and quick selections of varying experiment process components and, accurately, displaying compatibilities between the selected experiment process components. Accordingly, the experiment design interface system provides flexible user interfaces that facilitate customization of experiment designs via limitless selections of varying combinations of one or more data analysis models and other experiment process components in an experiment design.

Furthermore, the experiment design interface system also facilitates the creation of experiment designs with improved computational efficiency. Specifically, unlike conventional systems that require an inefficient brute force execution approach to determine whether an experiment design will properly execute, the experiment design interface system can utilize the analysis code validation components from selected data analysis model(s) to determine whether an experiment design fits (or is compatible) with the selected data analysis model(s) prior to runtime of the experiment design. Indeed, the experiment design interface system can detect potential errors and/or incompatibilities between data analysis model(s) and other experiment process components prior to run time of the experiment design. In addition, the experiment design interface system can also utilize conditions from the analysis code validation components to provide (or display) one or more reasons for the detected potential errors and/or incompatibilities.

In one or more instances, such detections of potential errors and/or incompatibilities prior to run time of an experiment design often reduces inefficient executions of faulty experiment designs. Moreover, in many cases, the experiment design interface system also enables modification of the experiment design prior to run time to resolve the identified potential errors and/or incompatibilities. Thus, the experiment design interface system can significantly reduce the time, number of interactions, and number of experiment design executions needed relative to conventional systems (e.g., significantly reducing inefficient utilization of computational resources).

Furthermore, the experiment design interface system also displays efficient graphical user interfaces that enables immediate indicators for incompatible experiment process components upon selection of various experiment process components. For instance, the experiment design interface system can quickly and efficiently indicate potential issues and/or reasons for the potential issues without requiring substantial user navigation to locate the potential issues. In particular, the experiment design interface system can facilitate the selection of experiment design components and display a compatibility of the experiment design components within a single user interface (and/or in a limited number of user interfaces) such that quick experiment design modifications are possible prior to executing computationally expensive experiment designs.

Additional detail regarding an experiment design interface system 106 will now be provided with reference to the figures. In particular, FIG. 1 illustrates a schematic diagram of a system environment in which the experiment design interface system 106 can operate in accordance with one or more embodiments.

As shown in FIG. 1, the environment includes server(s) 102 (which includes a tech-bio exploration system 104 and the experiment design interface system 106), a network 108, client device(s) 110, and testing device(s) 112. As further illustrated in FIG. 1, the various computing devices within the environment can communicate via the network 108. Although FIG. 1 illustrates the experiment design interface system 106 being implemented by a particular component and/or device within the environment, the experiment design interface system 106 can be implemented, in whole or in part, by other computing devices and/or components in the environment (e.g., the client device(s) 110). Additional description regarding the illustrated computing devices is provided with respect to FIG. 10 below.

As shown in FIG. 1, the server(s) 102 can include the tech-bio exploration system 104. In some embodiments, the tech-bio exploration system 104 can determine, store, generate, and/or display tech-bio information including maps of biology, biology (or chemistry) experiments from various sources, and/or machine learning tech-bio predictions. For instance, the tech-bio exploration system 104 can analyze data signals corresponding to various treatments or interventions (e.g., compounds or biologics) and the corresponding relationships in genetics, protenomics, phenomics (i.e., cellular phenotypes), and invivomics (e.g., expressions or results within a living animal). In one or more embodiments, the server(s) 102 comprises a data server. In some implementations, the server(s) 102 comprises a communication server or a web-hosting server.

For instance, the tech-bio exploration system 104 can generate and access experimental results corresponding to gene sequences, protein shapes/folding, protein/compound interactions, phenotypes resulting from various interventions or perturbations (e.g., gene knockout sequences or compound treatments), and/or invivo experimentation on various treatments in living animals. By analyzing these signals (e.g., utilizing various machine learning models), the tech-bio exploration system 104 can generate or determine a variety of predictions and inter-relationships for improving treatments/interventions.

To illustrate, the tech-bio exploration system 104 can generate maps of biology indicating biological inter-relationships or similarities between these various input signals to discover potential new treatments. For example, the tech-bio exploration system 104 can utilize machine learning and/or maps of biology to identify a similarity between a first gene associated with disease treatment and a second gene previously unassociated with the disease based on a similarity in resulting phenotypes from gene knockout experiments. The tech-bio exploration system 104 can then identify new treatments based on the gene similarity (e.g., by targeting compounds that impact the second gene). Similarly, the tech-bio exploration system 104 can analyze signals from a variety of sources (e.g., protein interactions, or invivo experiments) to predict efficacious treatments based on various levels of biological data.

The tech-bio exploration system 104 can generate GUIs comprising dynamic user interface elements to convey tech-bio information and receive user input for intelligently exploring tech-bio information. Indeed, as mentioned above, the tech-bio exploration system 104 can generate GUIs displaying different maps of biology that intuitively and efficiently express complex interactions between different biological systems for identifying improved treatment solutions. Furthermore, the tech-bio exploration system 104 can also electronically communicate tech-bio information between various computing devices.

As shown in FIG. 1, the tech-bio exploration system 104 can include a system that facilitates various models or algorithms for generating maps of biology (e.g., maps or visualizations illustrating similarities or relationships between genes, proteins, diseases, compounds, and/or treatments) and discovering new treatment options over one or more networks. For example, the tech-bio exploration system 104 collects, manages, and transmits data across a variety of different entities, accounts, and devices. In some cases, the tech-bio exploration system 104 is a network system that facilitates access to (and analysis of) tech-bio information within a centralized operating system. Indeed, the tech-bio exploration system 104 can link data from different network-based research institutions to generate and analyze maps of biology.

As used herein, the term "machine learning model" includes a computer algorithm or a collection of computer algorithms that can be trained and/or tuned based on inputs to approximate unknown functions. For example, a machine learning model can include a computer algorithm with branches, weights, or parameters that changed based on training data to improve for a particular task. Thus, a machine learning model can utilize one or more (deep) learning techniques (e.g., supervised or unsupervised learning) to improve in accuracy and/or effectiveness. Example machine learning models include various types of decision trees, support vector machines, Bayesian networks, random forest models, or neural networks (e.g., deep neural networks, generative adversarial neural networks, convolutional neural networks, recurrent neural networks, or diffusion neural networks). Similarly, the term "machine learning data" refers to information, data, or files generated or utilized by a machine learning model. Machine learning data can include training data, machine learning parameters, or embeddings/predictions generated by a machine learning model.

As shown in FIG. 1, the tech-bio exploration system 104 can include a system that comprises the experiment design interface system 106 that generates, via user selections in an experiment design user interface, an experiment design. Furthermore, the experiment design interface system 106 can also generate and display compatibility metrics between experiment design and data analysis model(s) selected for the experiment design. Indeed, the experiment design interface system 106 can extract (or identify) analysis code validation components from the data analysis model(s) that detect design errors (e.g., incompatibilities) between the selected data analysis model(s) and the experiment design. Furthermore, the experiment design interface system 106 can also generate graphical user interfaces to display the detected compatibilities to prevent execution of an incompatible (and/or inoperable) experiment design and/or to pinpoint the cause of the incompatibility.

As also illustrated in FIG. 1, the environment includes the client device(s) 110. For example, the client device(s) 110 may include, but is not limited to, a mobile device (e.g., smartphone, tablet) or other type of computing device, including those explained below with reference to FIG. 10. Additionally, the client device(s) 110 can include a computing device associated with (and/or operated by) user accounts for the tech-bio exploration system 104. Moreover, the environment can include various numbers of client devices that communicate and/or interact with the tech-bio exploration system 104 and/or the experiment design interface system 106.

Furthermore, in one or more implementations, the client device(s) 110 includes a client application. The client application can include instructions that (upon execution) cause the client device(s) 110 to perform various actions. For example, a user of a user account can interact with the client application on the client device(s) 110 to access tech-bio information, initiate a selection of one or more experiment process components and/or analysis model components to generate an experiment design, introduce (or include) analysis code validation components to cause a generation of one or more compatibility metrics between analysis model components and the experiment design, and generate graphical user interfaces to display compatibility metrics between the analysis model components and the experiment design.

As further shown in FIG. 1, the environment includes the network 108. As mentioned above, the network 108 can enable communication between components of the environment. In one or more embodiments, the network 108 may include a suitable network and may communicate using a various number of communication platforms and technologies suitable for transmitting data and/or communication signals, examples of which are described with reference to FIG. 10. Furthermore, although FIG. 1 illustrates computing devices communicating via the network 108, the various components of the environment can communicate and/or interact via other methods (e.g., communicate directly).

As mentioned previously, in one or more implementations, the experiment design interface system 106 generates one or more experiment designs (via an experiment design user interface). As used herein, the term "experiment design" refers to a collection of processes to generate (or create) data to analyze for biological (or chemical) relationships. For instance, an experiment design can include experiment components, such as, a collection of machine learning processes, experiment components, testing devices, experiment samples, control variables or configurations, various compound selections or configurations, protein-to-gene mappings, gene imaging, cell imaging, molecular imaging, medical imaging, feature extraction models, and/or data analysis models. Indeed, the experiment design interface system 106 can generate an experiment design that includes various inputs and various outputs, from a pipeline of the various experiment components, that are analyzed via one or more data analysis models to determine, predict, and/or observe biological (or chemical) relationships.

As further used herein, the term "feature extraction model" refers to a computer algorithm or a collection of computer algorithms that generate features from various outcomes of an experiment process (e.g., raw experimental data). For instance, in some cases, a feature extraction model includes one or more machine learning models that generate embeddings and/or features from images of experiment process outcomes. As an example, a feature extraction model can receive images of experiment process outcomes (e.g., images of cells, molecular images, compound samples, and/or other images of experiment process outcomes) to generate a latent feature or embedding from the images of the experiment process outcome.

In some embodiments, a feature extraction model can identify and transform relevant attributes or information from raw experimental data. For example, the feature extraction model can generate machine learning embeddings from phenomic digital images. Additionally, a feature extraction model can embed perturbation images into a low dimensional feature space via a machine learning model (e.g., a convolutional neural network) to generate perturbation image embeddings. For instance, a feature extraction model can generate an image embedding (e.g., perturbation embeddings, perturbation image embeddings or phenomic image embeddings) as numerical representations of a perturbation image. For example, an embedding can include a vector representation of a perturbation image generated by the feature extraction model.

In some cases, the experiment design interface system 106, as part of an experiment design, generates and accesses machine learning objects, such as results from biological assays. As shown, in FIG. 1, the experiment design interface system 106 can communicate with testing device(s) 112 to obtain and then store this information. For example, the tech-bio exploration system 104 can interact with the testing device(s) 112 that include intelligent robotic devices and camera devices for generating and capturing digital images of cellular phenotypes resulting from different perturbations (e.g., genetic knockouts or compound treatments of stem cells). Similarly, the testing device(s) can include camera devices and/or other sensors (e.g., heat or motion sensors) capturing real-time information from animals as part of invivo experimentation. The tech-bio exploration system 104 can also interact with a variety of other testing device(s) such as devices for determining, generating, or extracting gene sequences or protein information. The experiment design (or experiment components of the experiment design) can include, but is not limited to, configurations, inputs, outputs, models, and/or settings for the testing device(s) 112.

Figure 2A:
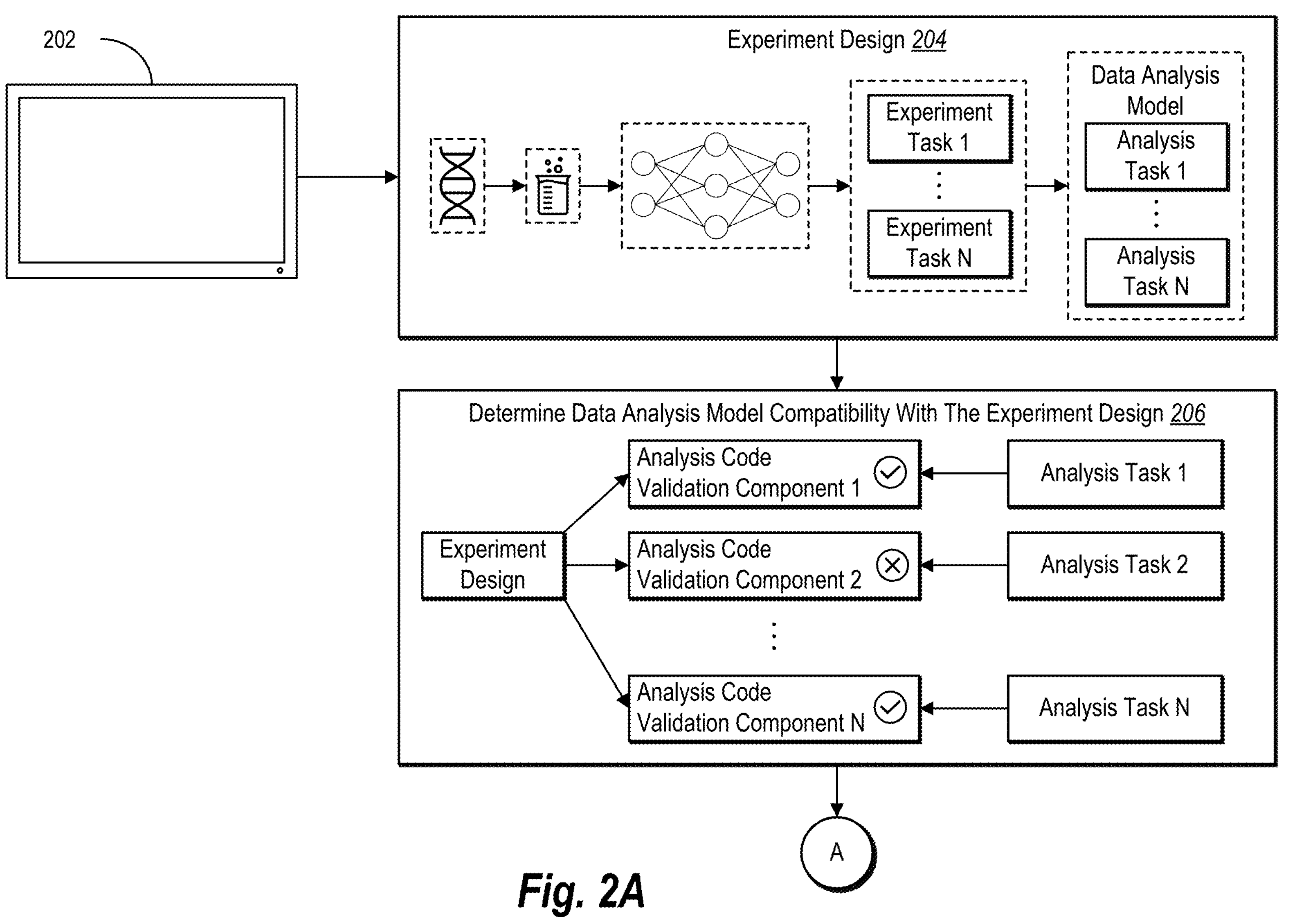
FIGS. 2A and 2B illustrate an overview of an experiment design interface system generating and displaying a compatibility validation graphical user interface in accordance with one or more embodiments.
Figure 2B:
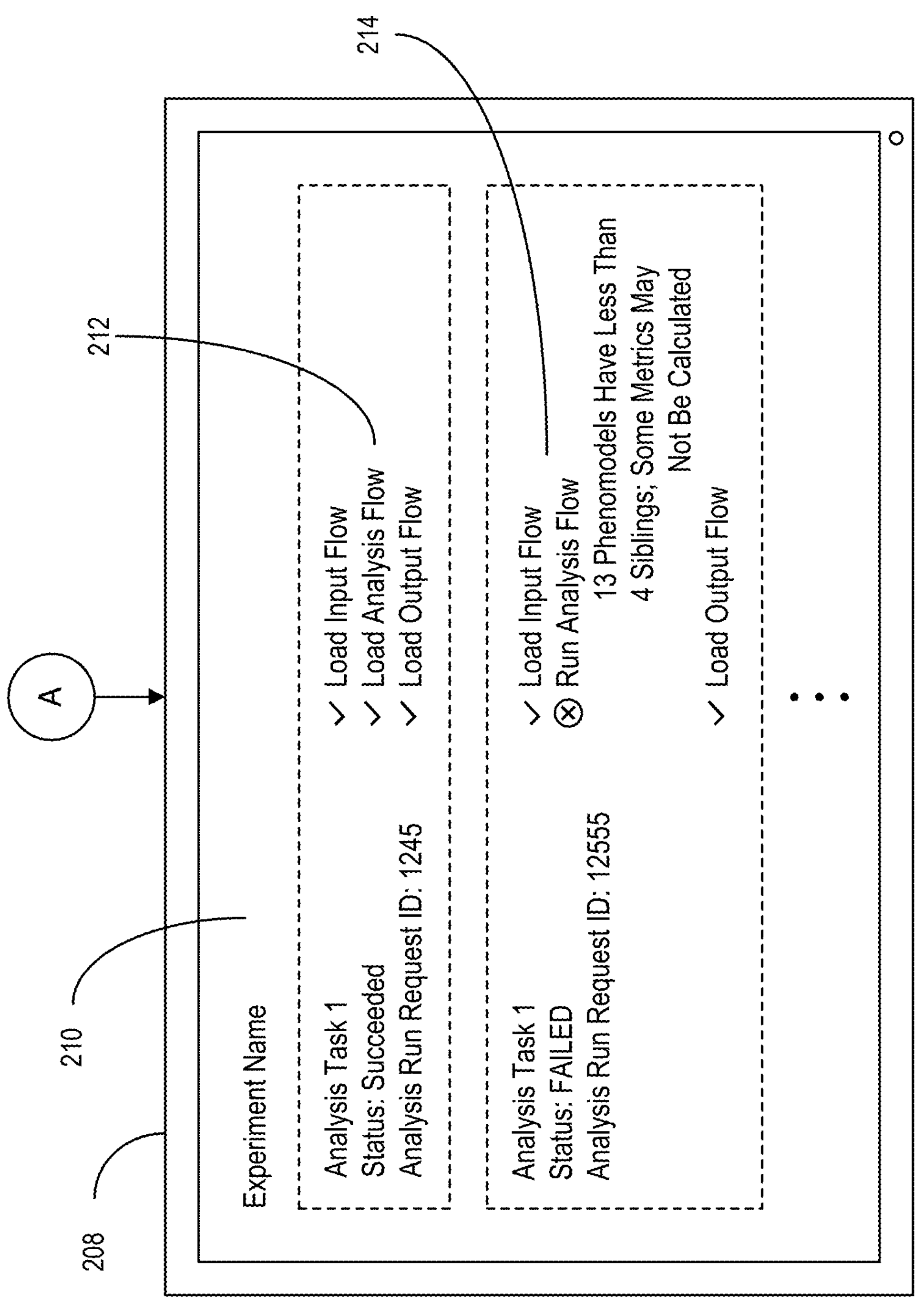

As mentioned above, the experiment design interface system 106 can generate graphical user interfaces to display detected compatibilities between experiment designs and data analysis models (selected via user selections in an experiment design user interface). Indeed, FIGS. 2A and 2B illustrate an overview of the experiment design interface system 106 generating and displaying a compatibility validation graphical user interface. For instance, FIGS. 2A and 2B illustrates generating a compatibility validation graphical user interface to display detected compatibilities between selected experiment designs and data analysis models in accordance with one or more embodiments.

Specifically, as shown in FIG. 2A, the experiment design interface system 106 utilizes one or more user interactions with an experiment design interface within a client device 202 to generate an experiment design 204. For example, as shown in FIG. 2A, the experiment design 204 includes experiment process components, such as experiment sample configurations, machine learning models, compound selections, experiment tasks, and a data analysis model. Indeed, the experiment design interface system 106 displaying an experiment design interface and generating experiment designs is described in greater detail below (e.g., in relation to FIG. 4).

Furthermore, as shown in act 206 of FIG. 2A, the experiment design interface system 106 determines data analysis model compatibility with the experiment design. Indeed, as shown in the act 206 of FIG. 2A, the experiment design interface system 106 identifies analysis code validation components for analysis tasks from the experiment design. Moreover, as shown in the act 206 of FIG. 2A, the experiment design interface system 106 compares the analysis code validation component representation to the experiment design to determine whether the experiment design satisfies one or more conditions of the analysis code validation components (to generate a compatibility metric). Indeed, as shown in the act 206 of FIG. 2A, the experiment design interface system 106 identifies that the analysis task 1 is compatible with the experiment design (via the analysis code validation component 1), the analysis task 2 is not compatible with the experiment design (via the analysis code validation component 2), and the analysis task N is compatible with the experiment design (via the analysis code validation component N). Indeed, the experiment design interface system 106 determines data analysis model compatibility with the experiment design is described in greater detail below (e.g., in relation to FIGS. 3, 5, and 6).

Furthermore, as used herein, the term "compatibility metric" refers to a value or determination that indicates a positive and/or negative compatibility. In some instances, the compatibility metric includes a binary value or indicator that designates a data analysis model as compatible and/or incompatible with an experiment design (e.g., the experiment design meets or satisfies conditions of the data analysis model). In some cases, the compatibility metric can include a binary value, such as, a true and false signal, a text value indicating compatible or incompatible, and/or a returned flag based on failing a condition of an analysis code validation component.

Moreover, as shown in the transition from FIG. 2A to FIG. 2B, the experiment design interface system 106 generates a graphical user interface to display detected compatibilities between the data analysis model and the experiment design. For instance, as shown in FIG. 2B, the experiment design interface system 106 provides, for display within a compatibility graphical user interface 210 of a client device 208, a compatibility element 212 indicating that analysis task 1 (from the act 206) is compatible with the experiment design (e.g., a positive confirmation for loading the analysis flow). Moreover, as also shown in FIG. 2B, the experiment design interface system 106 provides, for display within the compatibility graphical user interface 210 of the client device 208, a compatibility element 214 indicating that analysis task 2 (from the act 206) is not compatible with the experiment design (e.g., a negative confirmation for loading the analysis flow) with a description representing the one or more conditions of the analysis code validation component 2. Indeed, the experiment design interface system 106 generates and displays a compatibility graphical user interface as described in greater detail below (e.g., in relation to FIGS. 7 and 8).

As previously mentioned, the experiment design interface system 106 can identify (or extract) one or more analysis code validation components from a data analysis model. In some cases, the experiment design interface system 106 facilitates the creation of analysis code validation components within a data analysis model. For instance, FIG. 3 illustrates the experiment design interface system 106 generating a data analysis model that includes analysis code validation components.

Figure 3:
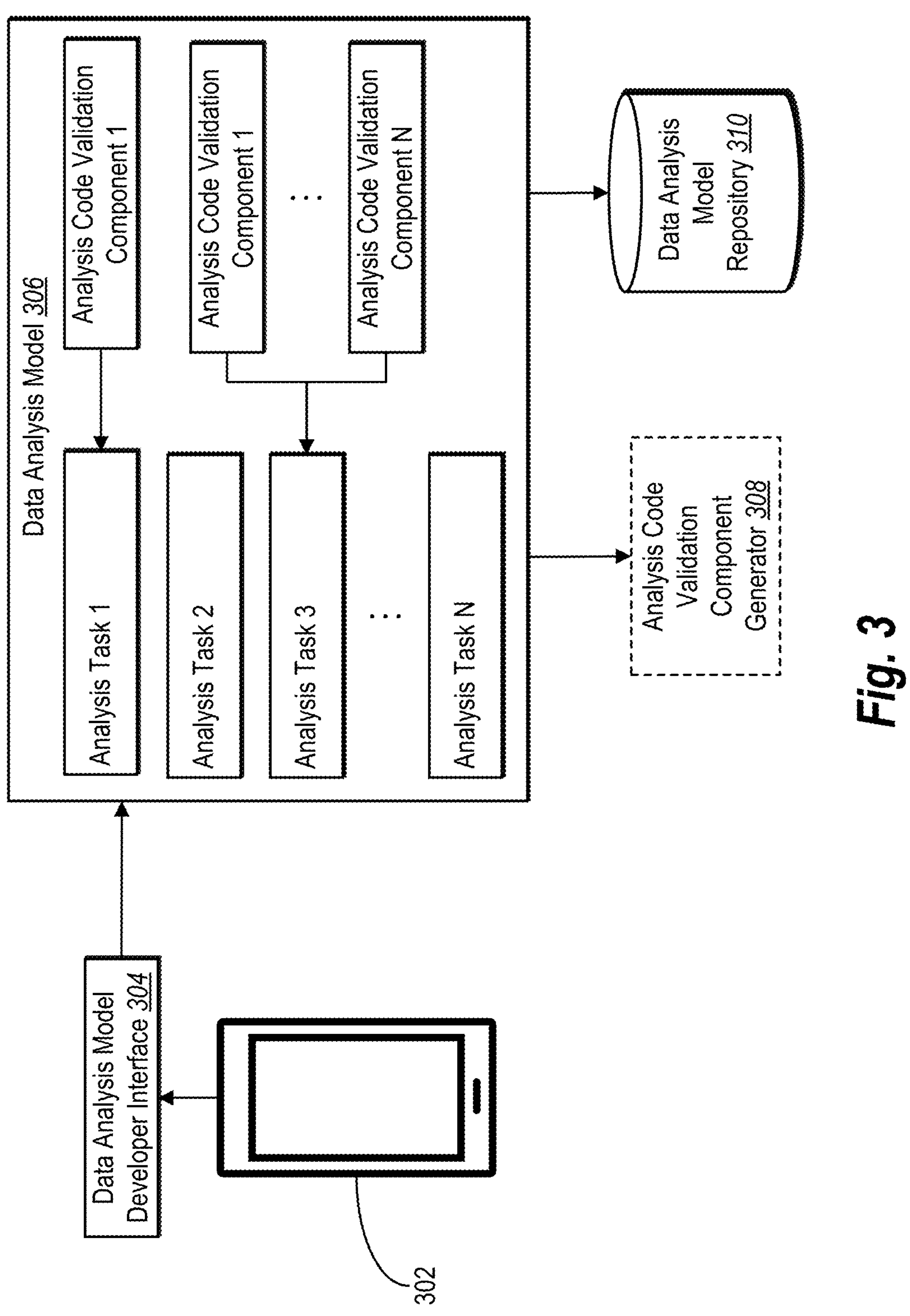
FIG. 3 illustrates an experiment design interface system generating a data analysis model with analysis code validation components in accordance with one or more embodiments.

As shown in FIG. 3, the experiment design interface system 106 receives user interactions with a data analysis model developer interface 304 from a client device 302 to generate a data analysis model 306. As shown in FIG. 3, the experiment design interface system 106 generates the data analysis model 306 with analysis tasks 1-N. Furthermore, the experiment design interface system 106 can receive one or more user interactions (in the data analysis model developer interface 304) to include (or assign) one or more analysis code validation components to the data analysis model 306 (or analysis tasks of the data analysis model 306). Indeed, as shown in FIG. 3, the experiment design interface system 106 generates the data analysis model 306 with an analysis code validation component 1 for the analysis task 1. Furthermore, as shown in FIG. 3, the experiment design interface system 106 also generates the data analysis model 306 with analysis code validation components 1-N (e.g., multiple analysis code validation components) for the analysis task 3.

As shown in FIG. 3, the experiment design interface system 106 can generate a data analysis model with various combinations of analysis code validation components for various analysis tasks. For instance, the experiment design interface system 106 can generate a data analysis model with a single analysis code validation component assigned to a particular analysis task or multiple analysis code validation components assigned to a particular analysis task. Furthermore, the experiment design interface system 106 can generate a data analysis model with one or more analysis tasks that are not associated with analysis code validation components.

In one or more instances, as used herein, the term "data analysis model" includes a computer algorithm or a collection of computer algorithms that generate inferences (or analyses) from input data. For example, a data analysis model includes a computer algorithm that includes approaches, such as statistical modeling techniques, machine learning algorithms, and/or other modeling approaches to determine analyzed data (e.g., patterns, inferences, quantitative data) from input data. In some cases, the experiment design interface system 106 utilizes a data analysis model to generate patterns, inferences, quantitative data from data provided by an experiment design (e.g., one or more features extracted by a feature extraction model, cell counts, gene counts, compound discoveries, biological perturbation data, protenomics, genetic outputs, phenomics, inviomics). In some instances, a data analysis model includes a computer algorithm that includes approaches, such as statistical modeling techniques, machine learning algorithms, and/or other modeling approaches to perform various drug screens, compound profiling, phenoscreening, reagent profiling, and/or assay sensitivity tests.

In one or more instances, a data analysis model can include one or more analysis tasks. For instance, as used herein, the term "analysis task" can include a particular (or sub-) collection of logic (or instructions) to perform a particular job (or task) of the data analysis model. For instance, an analysis task within a data analysis model can include, but is not limited to, fetching data from an experiment design (e.g., one or more features extracted by a feature extraction model, cell counts, gene counts, compound discoveries, biological perturbation data, protenomics, genetic outputs, phenomics, inviomics), computing a particular statistical analysis on fetched data, initializing or utilizing a machine learning model, and/or comparing fetched data.

Furthermore, as used herein, the term "analysis code validation component" (or sometimes referred to as "analysis validation component") refers to a collection of logic and/or instructions that detect one or more errors or compatibility issues between a data analysis model and one or more experiment process components of an experiment design. In particular, an analysis code validation component can include a collection of logic that forms one or more conditions (e.g., conditional checks) for one or more experiment process components. For example, the experiment design interface system 106 can utilize an analysis code validation component as a conditional trigger to check for the presence or absence of various features from the one or more experiment process components (for a compatibility determination). In addition, the experiment design interface system 106 can utilize an analysis code validation component to trigger a notification (or warning message) upon triggering or failing to trigger a condition of the analysis code validation component.

As used herein, the term "analysis code validation component representation" refers to a collection of data that represents logic and/or other features of an analysis code validation component. For instance, an analysis code validation component representation can include computer-readable code (e.g., assembly code, script code) that represents logic and/or other features of an analysis code validation component. In some instances, an analysis code validation component representation can include a graph-based representation of logic and/or other features of an analysis code validation component. For example, an analysis code validation component representation can include a graph-based representation, such as, but not limited to a directed acyclic graph representation of an analysis code validation component. In one or more instances, the experiment design interface system 106 extracts one or more analysis code validation components from a data analysis model (or a representation of the data analysis model) to generate the analysis code validation component representation.

As an example, an analysis code validation component (or analysis code validation component representation) can check whether an experiment design (of experiment process components) include a sufficient number of replicates (e.g., a condition such as, contains a threshold number of replicates) in the experiment design for a data analysis model to be compatible. Indeed, upon determining that the one or more experiment process components include a sufficient number of replicates (i.e., satisfy the condition of the analysis code validation component), the experiment design interface system 106 can determine that the experiment design is compatible with the data analysis model. Alternatively, upon determining that the one or more experiment process components do not include a sufficient number of replicates (i.e., do not satisfy the condition of the analysis code validate component), the experiment design interface system 106 can trigger a notification to indicate that the experiment design is not compatible with the data analysis model.

Indeed, an analysis code validation component can include various combinations of conditions to determine a compatibility of a data analysis model with one or more experiment process components in an experiment design. For example, the experiment design interface system 106 can utilize an analysis code validation component to verify (or check for) multiple conditional requirements in an experiment design to determine that the experiment design is compatible with a particular data analysis model associated with the analysis code validation component.

Furthermore, an analysis code validation component can include various conditional checks on various data analysis assumptions for a data analysis model, such as, but not limited to, checking if there are enough replicates of a compound, checking if genes in a phenomap have enough guides, checking if there is a sufficient cosine distribution in the experiment design, checking if there is a sufficient concentration distribution in the experiment design, checking for a particular concentration, checking if there is a sufficient concentration diversity, checking for a particular guide sequence, checking there is a sufficient diversity in guide sequences, checking for particular plate layouts, and/or checking for particular chemical dilutions in an experiment design. In some instances, the analysis code validation component can also include various conditional checks to check for various experiment process components utilized by a data analysis model, such as, but not limited to checking if a particular machine learning model is utilized, checking if a particular image size is utilized, checking if a particular image resolution is utilized, checking if a particular feature resolution is utilized, and/or checking if a particular testing device is utilized in an experiment design.

In addition, an analysis code validation component can also include one or more instructions for a triggered condition. In some cases, the experiment design interface system 106 can identify instructions from the analysis code validation component on triggering one or more of the conditions associated with the analysis code validation component. For instance, the analysis code validation component can include instructions with a triggered condition, such as, but not limited to, instructions to transmit (or display) an incompatibility notification and/or transmit (or display) descriptor for why the condition was triggered for a particular data analysis model (e.g., "the experiment does not include enough replicates," "the experiment does not include the correct guide sequence," "the experiment does not include the correct feature extraction model," "the experiment does not include the correct testing device").

In some cases, the experiment design interface system 106 can receive (or identify) a code representation of a data analysis model. For instance, the experiment design interface system 106 can receive a collection of code (e.g., source code) that represent computational instructions (as a code representation) to form a data analysis model. For example, a code representation of the data analysis model can include a set of code instructions for one or more data analysis model tasks. For example, a code representation of a data analysis model can include a collection of source code, such as, but not limited to, a Python script, Java source code, and/or C++ source code that represents one or more instructions to perform tasks of the data analysis model.

Furthermore, in some cases, the experiment design interface system 106 can identify (or extract) an analysis code validation representation of the data analysis mode by identifying a code representation of an analysis code validation component. For example, the experiment design interface system 106 can identify a portion of source code from the code representation of a data analysis model as an analysis code validation component. For instance, an analysis code validation component can include a function (or method) within a code representation of the data analysis model.

Additionally, the experiment design interface system 106 can include analysis code validation components within a code representation of a data analysis model by initializing (or importing) analysis code validation component libraries (or classes) within the code representation of a data analysis model. In some cases, the experiment design interface system 106 can also include triggers or tags for the analysis code validation component libraries (or classes) to activate (or deactivate) the analysis code validation components within the analysis data model. For instance, in some cases, the experiment design interface system 106 utilizes the triggers or tags for the analysis code validation component libraries (or classes) to selectively execute code for the analysis code validation components in the data analysis models without running or executing the experiment design and/or the data analysis model.

For example, the experiment design interface system 106 can generate (e.g., via user interaction) an analysis code validation component via a code representation as shown in the following exemplary code (Table 1).

TABLE 1

```
@li.validation_component
def my_validation( ):
    < code for one or more condition setup and/or component checking logic for the
    analysis code validation component >
    if my_success_condition == False:
        raise li.AnalysisValidationError("My validation component failed on
        testing")
```

Indeed, in one or more implementations, the experiment design interface system 106 utilizes the "raise" function in the above illustrated code example as a triggered condition, such as, but not limited to, instructions to transmit (or display) an incompatibility notification and/or transmit (or display) descriptor for why the condition was triggered for a particular data analysis model (e.g., "the experiment does not include enough replicates," "the experiment does not include the correct guide sequence," "the experiment does not include the correct feature extraction model," "the experiment does not include the correct testing device").

Moreover, as an example, the experiment design interface system 106 can include an analysis code validation component within a code representation of a data analysis model by including the following exemplary code (in Table 2) as an analysis code validation representation in association with a particular analysis task in the code representation of a data analysis model.

TABLE 2

```
from library.validation_component.general import my_validation_component
    with Flow('demo_flow') as demo_flow:
    < flow and/or data analysis model code before validation component >
    my_validation( )
    < flow and/or data analysis model code after validation component >
```

In some instances, the experiment design interface system 106 can utilize an experiment design flow orchestration tag with one or more data analysis models, data analysis model tasks, and/or experiment process components to associate an analysis code validation component with the one or more data analysis models, data analysis model tasks, and/or experiment process components. In particular, the experiment design interface system 106 can identify one or more data analysis models, data analysis model tasks, and/or experiment process components that include the experiment design flow orchestration tag and, in response, search for the analysis code validation component corresponding to the tag within the experiment design flow. Indeed, in response to the analysis code validation component corresponding to the tag missing from the experiment design flow, the experiment design interface system 106 can transmit (or display) a notification (or indicator) to indicate that the particular data analysis models, data analysis model tasks, and/or experiment process components that includes the experiment design flow orchestration tag is inserted into the experiment design flow, but the corresponding analysis code validation component is missing.

In some instances, the experiment design interface system 106 can utilize a prebuilt selectable analysis code validation component. For instance, the experiment design interface system 106, as part of the data analysis model developer interface 304, can receive a selection requesting to tag or assign one or more prebuilt analysis code validation components to a particular data analysis model and/or data analysis model task. In response to the request, the experiment design interface system 106 can attach (or assign) one or more analysis code validation components to a selected data analysis model and/or data analysis model task.

Although one or more embodiments illustrate the experiment design interface system 106 associating an analysis code validation component to a data analysis model task, the experiment design interface system 106 can assign (or tag) a data analysis model with one or more analysis code validation components. In particular, the experiment design interface system 106 can utilize one or more analysis code validation components as part of an entire data analysis model to check for compatibility of the entire analysis data model against one or more experiment process components of an experiment design.

Furthermore, as shown in FIG. 3, the experiment design interface system 106 can store a data analysis model in a data analysis model(s) repository. For example, as shown in FIG. 3, the experiment design interface system 106 stores the data analysis model 306 in the data analysis model(s) repository 310. In addition, the experiment design interface system 106 can store the data analysis model 306 with the analysis code validation components in the data analysis model(s) repository 310.

Indeed, the experiment design interface system 106 can store data analysis model(s) and corresponding analysis code validation components in the data analysis model(s) repository 310 to enable (or facilitate) selection of the data analysis model(s) and corresponding analysis code validation components within multiple experiment designs. Indeed, the experiment design interface system 106 can reuse the data analysis model(s) and corresponding analysis code validation components within multiple experiment designs having various combinations of experiment process components. By including the corresponding analysis code validation components, the experiment design interface system 106 can also detect a compatibility of a data analysis model from the data analysis model(s) repository 310 when the data analysis model is selected for an experiment design in accordance with one or more implementations herein.

In some cases, the experiment design interface system 106 can also utilize an analysis code validation component generator 308 to generate one or more analysis code validation components. For instance, the experiment design interface system 106 can generate analysis code validation component by utilizing one or more executed historical experiment designs in relation to a data analysis model. For example, the experiment design interface system 106 can identify one or more attributes from experiment process components of a historical experiment design corresponding to a particular data analysis model. As an example, the experiment design interface system 106 can identify attributes, such as, but not limited to an average number of replicates utilized, a median concentration diversity, a particular plate layout, a particular testing device in one or more historical experiment design corresponding to a particular data analysis model. Subsequently, the experiment design interface system 106 can utilize the identified attributes to generate conditions within an analysis code validation component for the particular data analysis model (e.g., a condition requiring the attributes identified in the historical experiment designs). In some instances, the experiment design interface system 106 can utilize identified attributes from historical experiment designs to configure conditions for an analysis code validation component utilizing a statistical value from the attributes and/or a classification for the attributes from a machine learning model.

As mentioned above, the experiment design interface system 106 can display an experiment design user interface that enables user selections of experiment process components and data analysis models to generate an experiment design. For example, FIG. 4 illustrates the experiment design interface system 106 generating an experiment design from user selections in an experiment design user interface.

Figure 4:
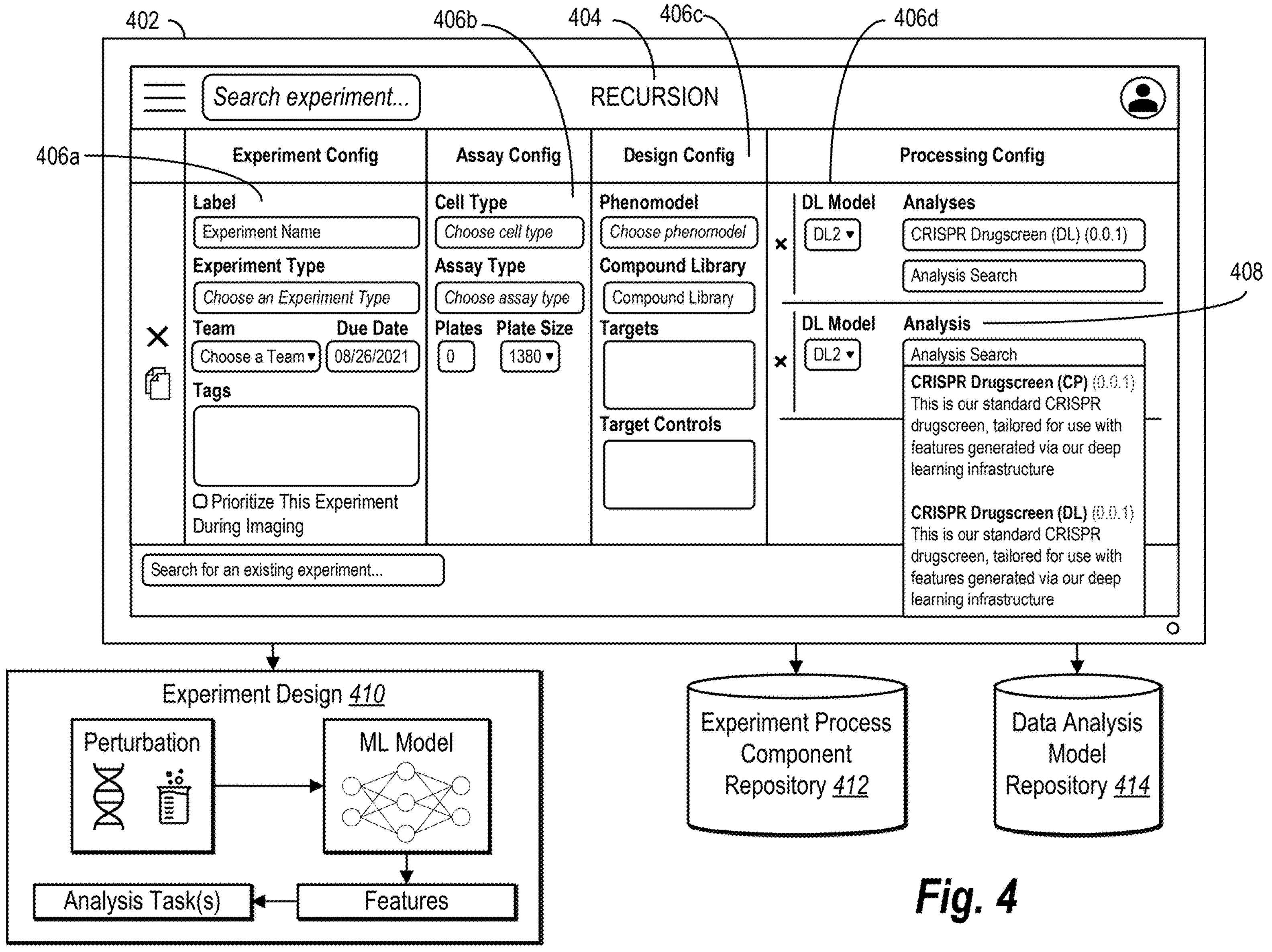
FIG. 4 illustrates an experiment design interface system generating an experiment design from user selections in an experiment design user interface in accordance with one or more embodiments.

For instance, as shown in FIG. 4, the experiment design interface system 106 can provide, for display within a client device 402, an experiment design user interface 404. Furthermore, as shown in FIG. 4, the experiment design interface system 106 can provide, for display within the experiment design user interface 404, experiment design selection elements 406*a*-406*d* and data analysis model selection elements 408. Furthermore, in response to receiving user interactions with the experiment design selection elements 406*a*-406*d* and the data analysis model selection elements 408 in the experiment design user interface 404, the experiment design interface system 106 identifies an experiment design 410.

Furthermore, as shown in FIG. 4, the experiment design interface system 106 utilizes various experiment process component(s) from an experiment process component repository 412 to populate and utilize experiment process components corresponding to the experiment design selection elements 406*a*-406*d*. Moreover, as shown in FIG. 4, the experiment design interface system 106 utilizes various data analysis models from a data analysis model repository 414 to populate and utilize the data analysis model selection elements 408. In addition, the data analysis models from the data analysis model repository 414 can include one or more analysis code validation components in accordance with one or more implementations herein.

As illustrated in FIG. 4, the experiment design interface system 106 can display various experiment design selection elements 406*a*-406*d* within the experiment design user interface 404. For instance, as shown in FIG. 4, the experiment design interface system 106 displays the experiment design selection elements 406*a*-406*d* within the experiment design user interface 404 to receive selections to configure (or build) an experiment design from various experiment process components. Indeed, the various experiment process components can include various machine learning processes, experiment components, testing devices, experiment samples, control variables or configurations, various compound selections or configurations, feature extraction models, and/or data analysis models as described above.

For instance, as shown in FIG. 4, the experiment design interface system 106 displays experiment design selection elements 406*a* for selectable interface elements for experiment metadata configuration settings. In one or more implementations, the experiment design interface system 106 can receive, via the experiment design selection elements 406*a*, various experiment design metadata configuration settings, such as a label (or name) for an experiment design, an experiment type descriptor (e.g., a text input or a selection from a dropdown list of experiment types), experiment design team information, dates associated with the experiment design (e.g., a due date, a start date, scheduled date), and/or various tags for the experiment design. For instance, the experiment design interface system 106 can utilize received inputs for the experiment design metadata configuration settings to generate metadata (and other details) for the experiment design 410.

Additionally, as shown in FIG. 4, the experiment design interface system 106 displays experiment design selection elements 406*b* for selectable interface elements for assay configuration settings. For instance, the experiment design interface system 106 can receive, via the experiment design selection elements 406*b*, various experiment design settings for assay configurations. For instance, the experiment design interface system 106 can receive experiment design settings corresponding to a cell type utilized in the experiment design 410, an assay type utilized in the experiment design 410, a number of plates and plate sizes for the experiment design 410. In some instances, the experiment design interface system 106 can also receive plate configurations or layout types within the experiment design selection elements 406*b*. Indeed, the experiment design interface system 106 can utilize the received inputs for the experiment design assay configurations to generate assay configurations in the experiment design 410.

Moreover, as shown in FIG. 4, the experiment design interface system 106 displays experiment design selection elements 406*c* for selectable interface elements for experiment design configuration settings. In one or more implementations, the experiment design interface system 106 receives, via the experiment design selection elements 406*c*, various experiment design settings for experiment design configurations. In particular, the experiment design interface system 106 can receive experiment design configuration settings corresponding to one or more phenomodels selected for the experiment design 410, one or more compound libraries selected for the experiment design 410, targets for the experiment design, and target controls for the experiment design. Indeed, the experiment design interface system 106 can receive various experiment component configurations, such as, but not limited to, compound configurations, controls for the experiment design, phenomodels, testing devices, experiment samples, and/or control variables or configurations for the experiment design 410 (to generate or identify the experiment design 410).

Additionally, as shown in FIG. 4, the experiment design interface system 106 displays experiment design selection elements 406*d* for selectable interface elements for feature extraction model settings. In particular, the experiment design interface system 106 can receive, via the experiment design selection elements 406*d*, various selections (e.g., from a dropdown list, radio buttons, or text input) for one or more machine learning models to process outcomes (e.g., images or other observable data) from an experiment executed via the experiment design. Indeed, the experiment design interface system 106 can receive a selection of various feature extraction models (as described above). Moreover, the experiment design interface system 106 can utilize the received selections of feature extraction model(s) to include the feature extraction model(s) in the experiment design 410.

In addition, as shown in FIG. 4, the experiment design interface system 106 displays the data analysis model selection elements 408 to enable a selection of one or more data analysis models for the experiment design 410. For instance, the experiment design interface system 106 can receive, via the data analysis model selection elements 408, various selections for various data analysis models. For instance, the experiment design interface system 106 can receive a selection of one or more data analysis models from the data analysis model repository 414. Indeed, the selected data analysis models can include one or more analysis code validation components (as described above). Upon receiving a selection of the one or more data analysis models, via the data analysis model selection elements 408, the experiment design interface system 106 can utilize the selected data analysis models in the experiment design 410. Although, FIG. 4 illustrates the experiment design interface system 106 displaying selectable query results from a data analysis model search within the data analysis model selection elements 408, the experiment design interface system 106 can display selectable data analysis models via various user interface elements, such as, but not limited to, drop down lists and/or radio buttons.

In one or more embodiments, the experiment design interface system 106 can utilize selections from the experiment design user interface 404 to generate (or identify) the experiment design 410 with a variety of experiment process components and/or data analysis models. As an example, the experiment design interface system 106 can generate (or identify) an experiment design that generates outcomes or signals for gene sequences, protein shapes/folding, protein/compound interactions, phenotypes resulting from various interventions or perturbations (e.g., gene knockout sequences or compound treatments), and/or invivo experimentation on various treatments in living animals. Moreover, the experiment design can include feature extraction models and/or data analysis models to create and/or analyze data signals from the outcomes of the experiment design to determine a variety of predictions, inter-relationships, and/or patterns from the interventions, perturbations, and/or other experimentations.

As further shown in FIG. 4, the experiment design interface system 106 can facilitate user selections to assign a data analysis model to a particular feature extraction model. For example, the experiment design interface system 106 can assign or associate a particular data analysis model to a particular feature extraction model such that the particular data analysis model receives input data from output data of the particular feature extraction model. Indeed, the experiment design interface system 106 can enable multiple selections of data analysis models for a feature extraction model and/or multiple feature extraction models for a data analysis model.

Although, FIG. 4 illustrates particular experiment process components for an experiment design, the experiment design interface system 106 can display selectable interface elements for a variety of experiment process components (e.g., for various biological, chemical, or other experiments).

In addition, in some cases, the experiment design interface system 106 can utilize (or receive) experiment designs. For instance, the experiment design interface system 106 can provide selectable interface elements to import an experiment design from a third-party source or external repository. Indeed, the experiment design interface system 106 can receive an imported experiment design and one or more selections for data analysis models (with analysis code validation components) in accordance with one or more implementations herein.

For example, the experiment design interface system 106 can receive, from a third-party source or external repository, one or more experiment designs and/or analysis models (or protocols). In addition, the experiment design interface system 106 can register the received experiment designs and/or analysis models (or protocols) (via a code registration system). Then, the experiment design interface system 106 can identify one or more analysis code validation components that are compatible with (or fit) the received experiment designs and/or analysis models (or protocols). In some cases, the experiment design interface system 106 adds the identified analysis code validation components in the received experiment designs and/or analysis models (in accordance with one or more implementations herein). In some cases, the experiment design interface system 106 displays one or more the identified analysis code validation components as selectable options. Then, based on user interactions with the selectable analysis code validation components, the experiment design interface system 106 can add the one or more selected analysis code validation components into the received experiment design and/or data analysis models in accordance with one or more implementations herein.

In some instances, the experiment design interface system 106 can also display a user interface element for saved experiment designs (e.g., "search for an existing experiment . . . " in the experiment design user interface 404). In some cases, the experiment design interface system 106 receives a request for a saved experiment design and retrieves the saved experiment design. Furthermore, the experiment design interface system 106 can facilitate a selection of one or more additional (or new) data analysis models for the saved experiment design. Additionally, the experiment design interface system 106 can determine a compatibility of newly selected data analysis models for a saved experiment design in accordance with one or more implementations herein.

Figure 5:
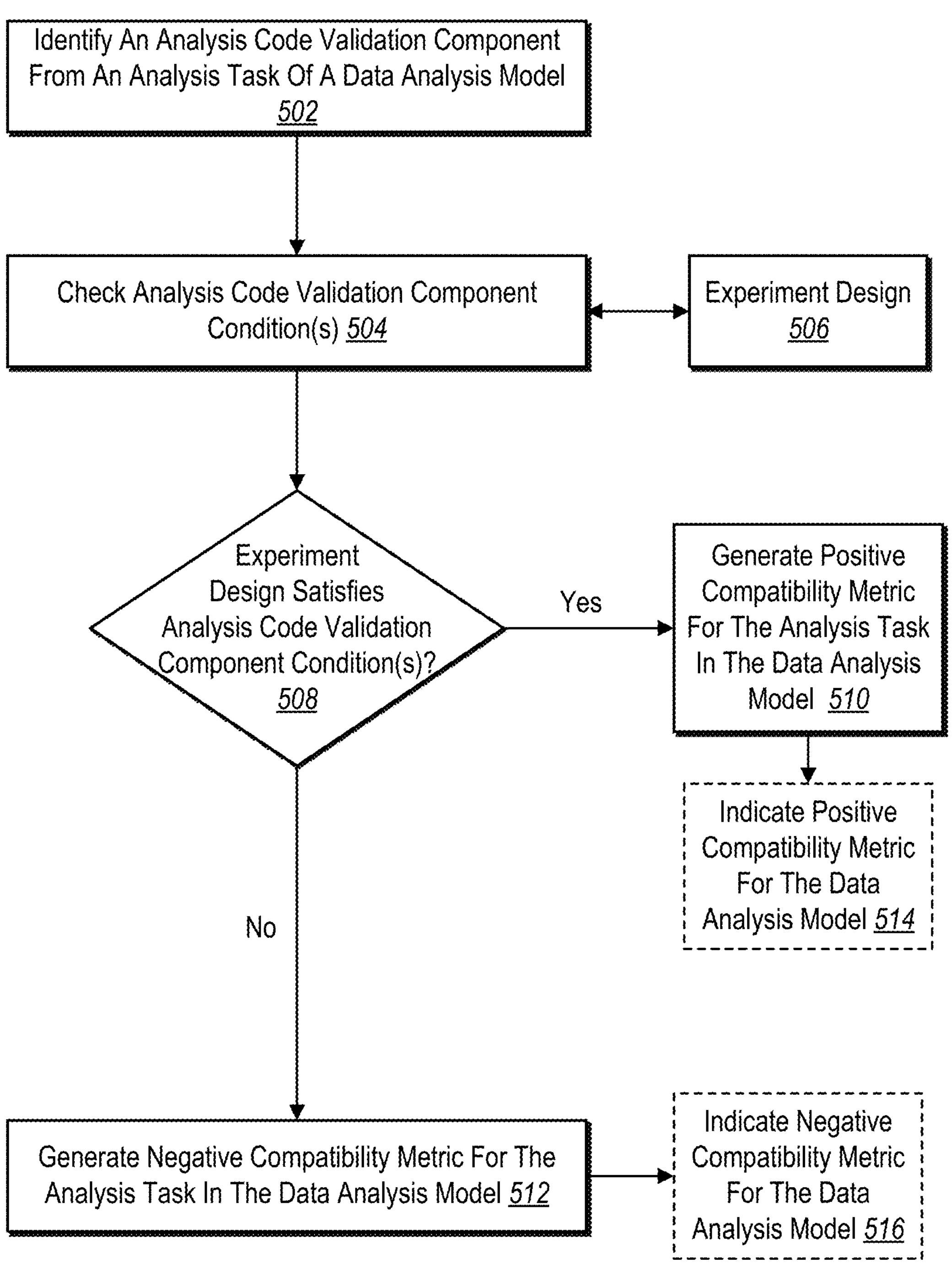
FIG. 5 illustrates a flow diagram of an experiment design interface system utilizing analysis code validation components to generate compatibility metrics for a data analysis model and an experiment design in accordance with one or more embodiments.

As mentioned above, the experiment design interface system 106 can generate compatibility metrics to determine whether an experiment design fits (or is compatible) with one or more data analysis model(s). For instance, FIG. 5 illustrates a flow diagram of the experiment design interface system 106 utilizing analysis code validation components to generate compatibility metrics for a data analysis model and an experiment design. Indeed, FIG. 5 illustrates the experiment design interface system 106 checking conditions of analysis code validation components against an experiment design to determine whether a data analysis model task from a data analysis model is compatible with the experiment design.

As shown in act 502 of FIG. 5, the experiment design interface system 106 identifies (or extracts) an analysis code validation component (e.g., an analysis code validation representation) from an analysis task of a data analysis model. Moreover, as shown in act 504 of FIG. 5, the experiment design interface system 106 checks analysis code validation component condition(s) with an experiment design 506 (associated with the data analysis model). Indeed, the experiment design interface system 106 can compare the analysis code validation component conditions with one or more experiment process components of the experiment design 506 in accordance with one or more implementations herein.

Furthermore, as shown in act 508 of FIG. 5, the experiment design interface system 106 determines if the experiment design 506 satisfies the analysis code validation component condition(s). Indeed, as shown in FIG. 5, upon determining that the experiment design 506 satisfies the analysis code validation component condition(s) (e.g., a positive, "yes," indication for the act 508), the experiment design interface system 106, in an act 510, generates a positive compatibility metric for the analysis task in the data analysis model. Indeed, the positive compatibility metric can indicate that the analysis task in the data analysis model is compatible with the experiment design 506 (based on the comparison in the act 504).

As also shown in FIG. 5, upon determining that the experiment design 506 does not satisfy the analysis code validation component condition(s) (e.g., a negative, "no," indication for the act 508), the experiment design interface system 106, in an act 512, generates a negative compatibility metric for the analysis task in the data analysis model. Indeed, the negative compatibility metric can indicate that the analysis task in the data analysis model is not compatible with the experiment design 506 (based on the comparison in the act 504).

Furthermore, the experiment design interface system 106 can utilize generated compatibility metrics for an analysis task (or the data analysis model) to display indication of the compatibility of the analysis task (or the data analysis model) relative to the experiment design. Indeed, in some embodiments, as shown in act 514 of FIG. 5, the experiment design interface system 106 indicates the positive compatibility metric for the data analysis model (or analysis task) upon generating a positive compatibility metric (in the act 510). Moreover, in some instances, as shown in act 516 of FIG. 5, the experiment design interface system 106 indicates a negative compatibility metric for the data analysis model (or analysis task) upon generating a negative compatibility metric (in the act 512). In one or more instances, the experiment design interface system 106 can display indicators for compatibility or incompatibility of data analysis models (or analysis tasks from the data analysis models) as described below (e.g., in relation to FIGS. 7 and 8).

Although FIG. 5 illustrates the experiment design interface system 106 utilizing an analysis code validation component to generate compatibility metrics for an analysis task from a data analysis model relative to an experiment design, the experiment design interface system 106 can repeat the acts of FIG. 5 for a variety of analysis code validation components corresponding to a variety of analysis tasks and/or data analysis models. Indeed, the experiment design interface system 106 can determine individual compatibility metrics for a number of analysis tasks and/or data analysis models based on a variety of analysis code validation components. Furthermore, the experiment design interface system 106 can display compatibilities of individual data analysis model tasks and/or data analysis models relative to an experiment design utilizing the individual compatibility metrics.

Figure 6:
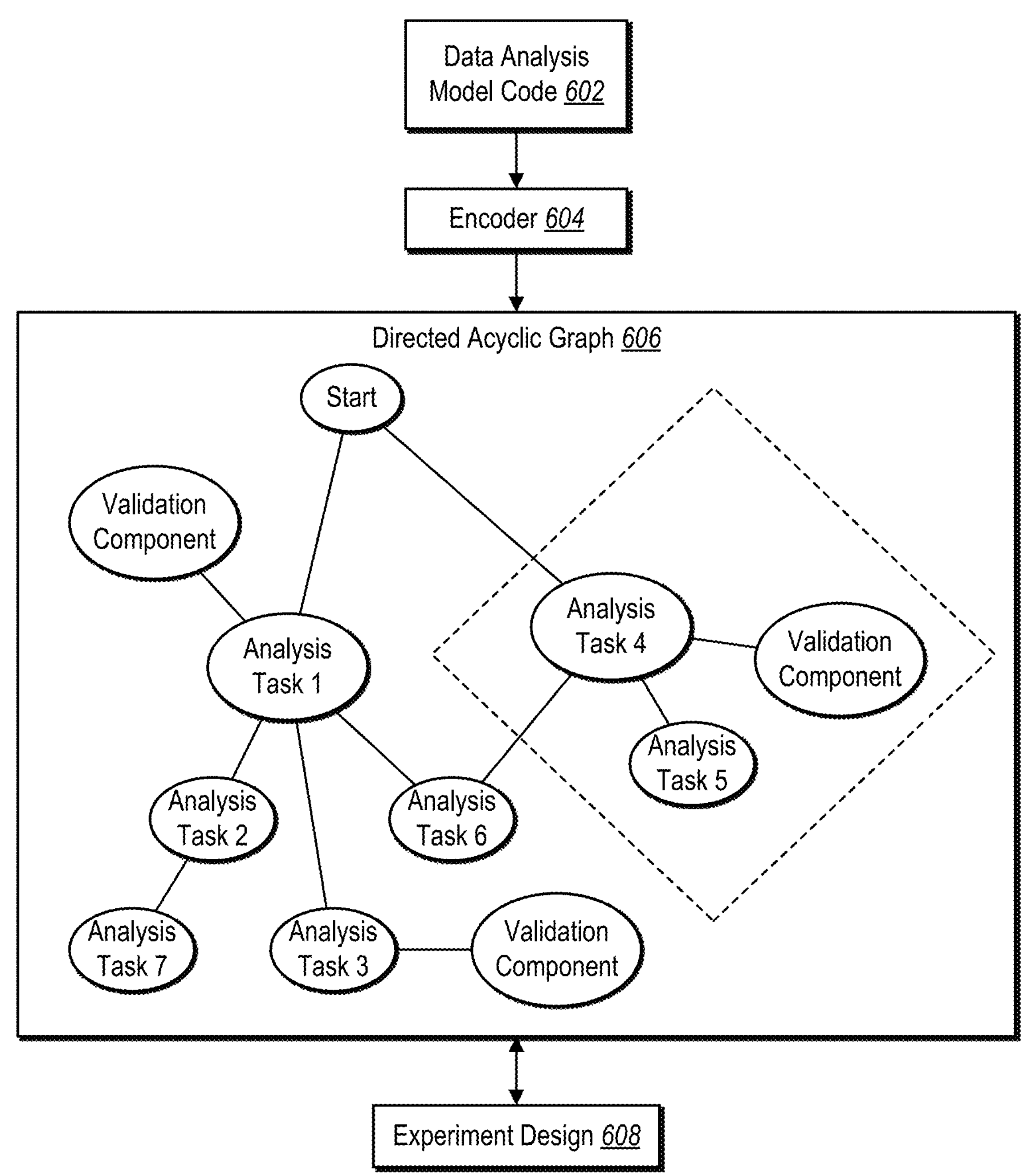
FIG. 6 illustrates an experiment design interface system generating an analysis code validation representation in accordance with one or more embodiments.

In some case, the experiment design interface system 106 generates an analysis code validation representation from a data analysis model using a directed acyclic graph of a data analysis model. For instance, FIG. 6 illustrates the experiment design interface system 106 generating an analysis code validation representation (and a data analysis model representation). In particular, FIG. 6 illustrate the experiment design interface system 106 generating an analysis code validation representation (and a data analysis model representation) by generating a directed acyclic graph from a data analysis model.

As shown in FIG. 6, the experiment design interface system 106 utilizes an encoder 604 with a data analysis model code 602 (of a data analysis model) to generate a directed acyclic graph 606. Indeed, in one or more embodiments, the experiment design interface system 106 accesses a code corresponding to a data analysis model and extracts one or more features of the code to generate a directed acyclic graph that represents activities (or tasks) of the code (via nodes) and a representation of the flow from one task to another task (via edges). For example, as shown in FIG. 6, the directed acyclic graph 606 includes a variety of nodes for analysis tasks identified from the data analysis model code 602 (e.g., "analysis task 1," "analysis task 2," . . . , "analysis task 5"). Additionally, as shown in FIG. 6, the directed acyclic graph 606 includes edges between analysis task nodes to indicate dependencies of the analysis tasks (e.g., analysis task 2 runs after analysis task 1, analysis task 6 utilizes analysis task 1 and analysis task 4).

As further shown in FIG. 6, the experiment design interface system 106 generates the directed acyclic graph 606 with analysis code validation component nodes tagged (or attached) to the analysis task nodes (as an analysis code validation representation). For instance, as shown in FIG. 6, the directed acyclic graph 606 includes a validation component node for the analysis task 1 node, a validation component for the analysis task node 4, and a validation component node for the analysis task 3 node. Although the directed acyclic graph 606 illustrates a particular example of analysis task nodes and validation component nodes, the experiment design interface system 106 can generate a directed acyclic graph for a variety of data analysis models that include various numbers (and combinations) of analysis tasks and/or analysis code validation components (in accordance with one or more implementations herein).

In addition, the experiment design interface system 106 can utilize the analysis code validation representation in the directed acyclic graph to determine (or generate) compatibility metrics for one or more analysis tasks of the data analysis model relative to an experiment design. For instance, as shown in FIG. 6, the experiment design interface system 106 compares the directed acyclic graph 606 (as an analysis code validation representation) with experiment process components from the experiment design 608.

Indeed, the experiment design interface system 106 can compares (or check) conditions corresponding to the validation components from the directed acyclic graph 606 with one or more components from the experiment design 608 to determine compatibility metrics for the analysis task nodes (in accordance with one or more implementations herein).

As an example, in some cases, the experiment design interface system 106 can determine that the experiment design 608 satisfies one or more analysis code validation component conditions corresponding to a validation component node from the directed acyclic graph 606. For instance, in reference to FIG. 6, the experiment design interface system 106 can determine a positive compatibility metric for a validation component corresponding to the analysis task 1 node and a positive compatibility metric for a validation component corresponding to the analysis task 3 node. In response, the experiment design interface system 106 can determine and/or indicate that analysis task 1, analysis task 2, and analysis task 3 are compatible with the experiment design 608. Indeed, in one or more instances, the experiment design interface system 106 can execute the experiment design with the data analysis model using the compatible analysis task nodes (e.g., that analysis task 1, analysis task 2, analysis task 3).

Furthermore, in some instance, the experiment design interface system 106 can determine that the experiment design 608 does not satisfy one or more analysis code validation component conditions corresponding to a validation component node from the directed acyclic graph 606. In reference to FIG. 6, the experiment design interface system 106 can determine a negative compatibility metric for a validation component corresponding to the analysis task 4 node. In response, the experiment design interface system 106 can determine and/or indicate that analysis task 4 is not compatible with the experiment design 608.

In some cases, the experiment design interface system 106 can execute the experiment design partially. For example, in response to determining that the analysis task 4 is not compatible with the experiment design 608, in some cases, the experiment design interface system 106 disables (e.g., does not execute) the incompatible analysis task 4 and other analysis tasks depending on the analysis task 4 node (e.g., analysis task 5 and analysis task 6). In some instances, the experiment design interface system 106 indicates (e.g., via the compatibility graphical user interface) the analysis task 4, analysis task 5, and analysis task 6 as incompatible with the experiment design 608 but executes the experiment design with the data analysis model using both the compatible and incompatible analysis task nodes.

Furthermore, in some embodiments, the experiment design interface system 106 can include, as part of the data analysis model and/or directed acyclic graph of a data analysis model, one or more analysis tasks that are incompatible with an experiment design without an associated analysis code validation component. For instance, in reference to FIG. 6, the analysis task 7 node of the directed acyclic graph 606 can be incompatible with the experiment design 608. However, as shown in FIG. 6, the analysis task 7 node does not include an analysis code validation component and, accordingly, the experiment design interface system 106 executes the experiment design with the data analysis model using the analysis task 7 node (without indicating or displaying that the analysis task 7 node is incompatible with the experiment design 608).

Additionally, in one or more embodiments, the experiment design interface system 106 displays a directed acyclic graph of the data analysis model to indicate compatibility metrics of various analysis task in the data analysis model. For instance, the experiment design interface system 106 can, provide for display within a compatibility graphical user interface, the directed acyclic graph 606 to indicate the compatibility metric of the data analysis model relative to the experiment design 608. In particular, the experiment design interface system 106 can display the directed acyclic graph 606 with compatibility elements (e.g., flags or other user interface elements) to display compatible analysis task nodes (e.g., analysis task 1, analysis task 2, and analysis task 3 nodes) and incompatible analysis task nodes (e.g., analysis task 4, analysis task 5, and analysis task 6 nodes) with corresponding validation components. In addition, the experiment design interface system 106 can also display the directed acyclic graph 606 with an indication of disabled or enabled analysis task nodes due to the compatibility.

Figure 7:
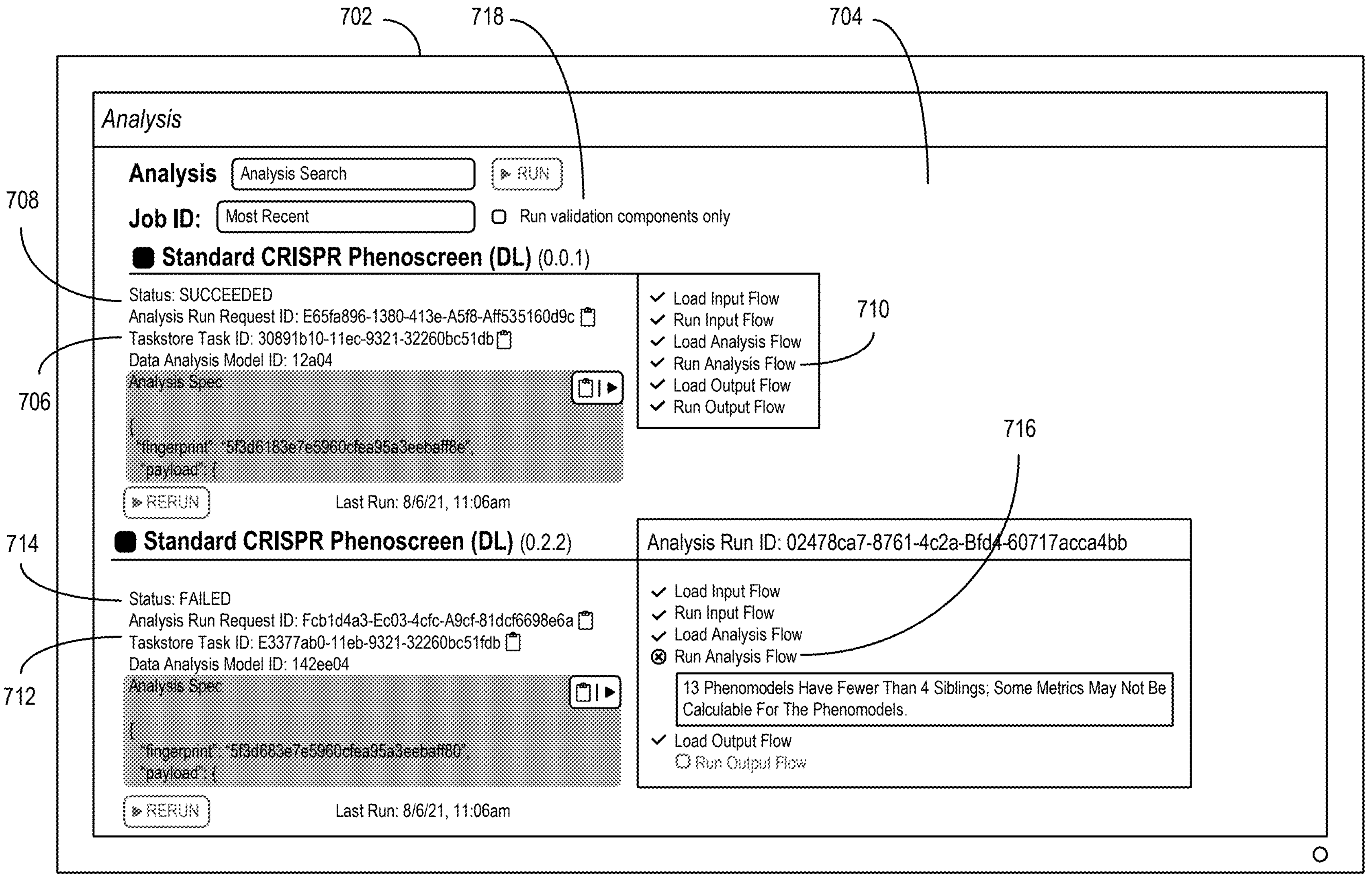
FIG. 7 illustrates an experiment design interface system displaying a compatibility graphical user interface that indicates compatibility of a data analysis model relative to an experiment design in accordance with one or more embodiments.

As also mentioned above, the experiment design interface system 106 can display a compatibility graphical user interface that indicates the compatibility of a data analysis model relative to an experiment design. For instance, FIG. 7 illustrates the experiment design interface system 106 displaying a compatibility graphical user interface. In particular, FIG. 7 illustrates the experiment design interface system 106 displaying a compatibility graphical user interface that indicates the compatibility of a data analysis model relative to an experiment design.

As shown in FIG. 7, the experiment design interface system 106 provides, for display within a client device 702, a compatibility graphical user interface 704. Moreover, as shown in FIG. 7, the experiment design interface system 106 provides, for display within the compatibility graphical user interface 704, an interface element 706 to display information for a first data analysis model (e.g., data analysis model name, data analysis model ID, a task ID, data analysis model code). Furthermore, as shown in FIG. 7, the experiment design interface system 106 also provides, for display within compatibility graphical user interface 704, a compatibility element 708 indicating a compatibility metric of the first data analysis model relative to the experiment design. Indeed, in reference to FIG. 7, the experiment design interface system 106 determines a positive compatibility metric (in accordance with one or more implementations herein) for the first data analysis model represented in the interface element 706 and, accordingly, displays a positive compatibility metric in the compatibility element 708 (e.g., "status: succeeded").

In addition, as shown in FIG. 7, the experiment design interface system 106 also provides a compatibility element 710 indicating a positive compatibility metric of the first data analysis model relative to the experiment design. Indeed, the compatibility element 710 indicates that data analysis model flow loaded and ran for an experiment design without triggering an analysis code validation component (e.g., a positive compatibility). In one or more instances, the experiment design interface system 106 can display a compatibility element to indicate a compatibility metric utilizing various interface elements, such as, but not limited to, symbols, text, and/or numerical values.

As also shown in FIG. 7, the experiment design interface system 106 provides, for display within the compatibility graphical user interface 704, an interface element 712 to display information for a second data analysis model (e.g., data analysis model name, data analysis model ID, a task ID, data analysis model code). Furthermore, as shown in FIG. 7, the experiment design interface system 106 also provides, for display within compatibility graphical user interface 704, a compatibility element 714 indicating a compatibility metric of the second data analysis model relative to the experiment design. Indeed, in reference to FIG. 7, the experiment design interface system 106 determines a negative compatibility metric (in accordance with one or more implementations herein) for the second data analysis model represented in the interface element 712 and, accordingly, displays a negative compatibility metric in the compatibility element 714 (e.g., "status: failed").

Additionally, as shown in FIG. 7, the experiment design interface system 106 also provides a compatibility element 716 indicating a negative compatibility metric of the second data analysis model relative to the experiment design. Indeed, the compatibility element 716 indicates that data analysis model flow failed to run for an experiment design (due to a detected incompatibility by triggering one or more analysis code validation components) (e.g., a negative compatibility). As also shown in FIG. 7, the experiment design interface system 106 displays, via the compatibility element 716, a description representing the one or more conditions of the analysis code validation components (or component nodes) that were triggered (or not satisfied). Indeed, as shown in FIG. 7, the experiment design interface system 106 indicates, via the compatibility element 716, that the experiment design did not satisfy an analysis code validation component condition because particular experiment process components were insufficient (e.g., "13 phenomodels have fewer than 4 siblings; some metrics may not be calculable for these phenomodels). In one or more instances, the experiment design interface system 106 can display various descriptions representing the one or more conditions of the analysis code validation components that are triggered (e.g., a detected incompatibility of a data analysis model and an experiment design).

Although FIG. 7 illustrates an experiment design interface system 106 displaying a compatibility graphical user interface during run time of an experiment design (e.g., loading and running input flow, loading and running analysis flow, loading and running output flow), the experiment design interface system 106 can display a compatibility graphical user interface that displays compatibility metrics for a data analysis model before run time. For instance, the experiment design interface system 106 can determine compatibility metrics and display the compatibility graphical user interface (in accordance with one or more implementations herein) for one or more data analysis models upon scheduling or selecting an experiment design.

In some cases, the experiment design interface system 106 can receive a user selection to run validation components without executing an experiment design process to determine compatibility metrics and display the compatibility graphical user interface (in accordance with one or more implementations herein) without executing an experiment design process. For example, as shown in FIG. 7, the experiment design interface system 106 provides, for display within the compatibility graphical user interface 704, a selectable user interface element 718 that requests to run validation components (e.g., without executing an experiment design process). Indeed, upon receiving a user interaction with the selectable user interface element 718, the experiment design interface system 106 can determine compatibility metrics and display the compatibility graphical user interface (in accordance with one or more implementations herein) for one or more data analysis models upon scheduling or selecting an experiment design (without executing an experiment design process).

In some cases, the experiment design interface system 106 can provide, for display, a selectable user interface element to execute an experiment design process. Indeed, in some cases, the experiment design interface system 106 can receive a user interaction with the selectable user interface element to execute an experiment design process even when an incompatible data analysis model is detected for the experiment design. For instance, the experiment design interface system 106 can execute an experiment design process despite displaying one or more negative compatibility metrics for a data analysis model in the experiment design (in accordance with one or more implementations herein).

Additionally, in some implementations, the experiment design interface system 106 provides, for display within a compatibility graphical user interface, a selectable user interface element to navigate to data for a data analysis model. For instance, the experiment design interface system 106 can display a selectable user interface element in relation to a compatibility element (e.g., displaying a positive and/or negative compatibility metric) to navigate to data for the data analysis model. Indeed, the experiment design interface system 106, upon receiving a user interaction with the selectable user interface element, can navigate to data for the data analysis model, such as, but not limited to, source code for the data analysis model, a directed acyclic graph for the data analysis model, and/or a user interface with configurations and/or options for the data analysis model.

In one or more embodiments, the experiment design interface system 106 also enables modifications to an experiment design upon identifying and displaying one or more negative compatibility metrics for a data analysis model relative to an experiment design. In particular, upon detecting and displaying a negative compatibility metric, the experiment design interface system 106 can display a selectable user interface element to navigate to the experiment design user interface (e.g., to fix and/or modify the experiment design to resolve the data analysis model incompatibility). Indeed, upon receiving a user interaction with the selectable user interface element, the experiment design interface system 106 displays the experiment design user interface, receives modifications to the experiment design, and compares the modified (or updated) experiment design to one or more data analysis models (and corresponding analysis code validation components) in accordance with one or more implementations herein. In some instances, the experiment design interface system 106 also enables the displayed experiment design user interface to receive one or more updates and/or modifications to selected data analysis models and determines compatibilities of the updated data analysis models relative to the experiment design in accordance with one or more implementations herein. Then, the experiment design interface system 106 can determine and display additional compatibility elements (for additional compatibility metrics) for the updated data analysis models and/or updated experiment designs in accordance with one or more implementations herein.

In one or more instances, the experiment design interface system 106 can display various combinations of compatible and/or incompatible data analysis models for various experiment designs in accordance with one or more implementations herein.

Furthermore, although one or more embodiments illustrate the experiment design interface system 106 utilizing analysis code validation components within an experiment design to determine compatibilities between the experiment design and a data analysis model, the experiment design interface system 106 can utilize analysis code validation components in various data processing pipelines. For instance, the experiment design interface system 106 can utilize the analysis code validation components to determine compatibilities between various data processing pipelines (e.g., a data orchestration pipeline, a data computation pipeline) that generate data and analysis models that analyze the generated data.

In some cases, the experiment design interface system 106 can generate experiment design errors to log data analysis model incompatibilities with experiment designs (in accordance with one or more implementations herein). For instance, the experiment design interface system 106 can generate one or more experiment design compatibility errors based on comparisons between the conditions in one or more analysis code validation components and an experiment design (as described above). Then, the experiment design interface system 106 can display the experiment design compatibility errors within a graphical user interface log (e.g., an orchestration and/or automation log).

Although one or more implementations describe displaying compatibility results in a user interface, in one or more embodiments, the experiment design interface system 106 can append compatibility (or error) information from the one or more analysis code validation components (e.g., as metadata or output reports from the experiment design). For instance, upon execution of an experiment design (with one or more data analysis models), the experiment design interface system 106 can generate or receive one or more output reports with analysis data and/or other data from the experiment design execution. Indeed, in some cases, the experiment design interface system 106 can append compatibility determinations from the one or more analysis code validation components (in accordance with one or more implementations herein) within the output reports of the experiment design and/or append the compatibility determinations as metadata.

Figure 8:
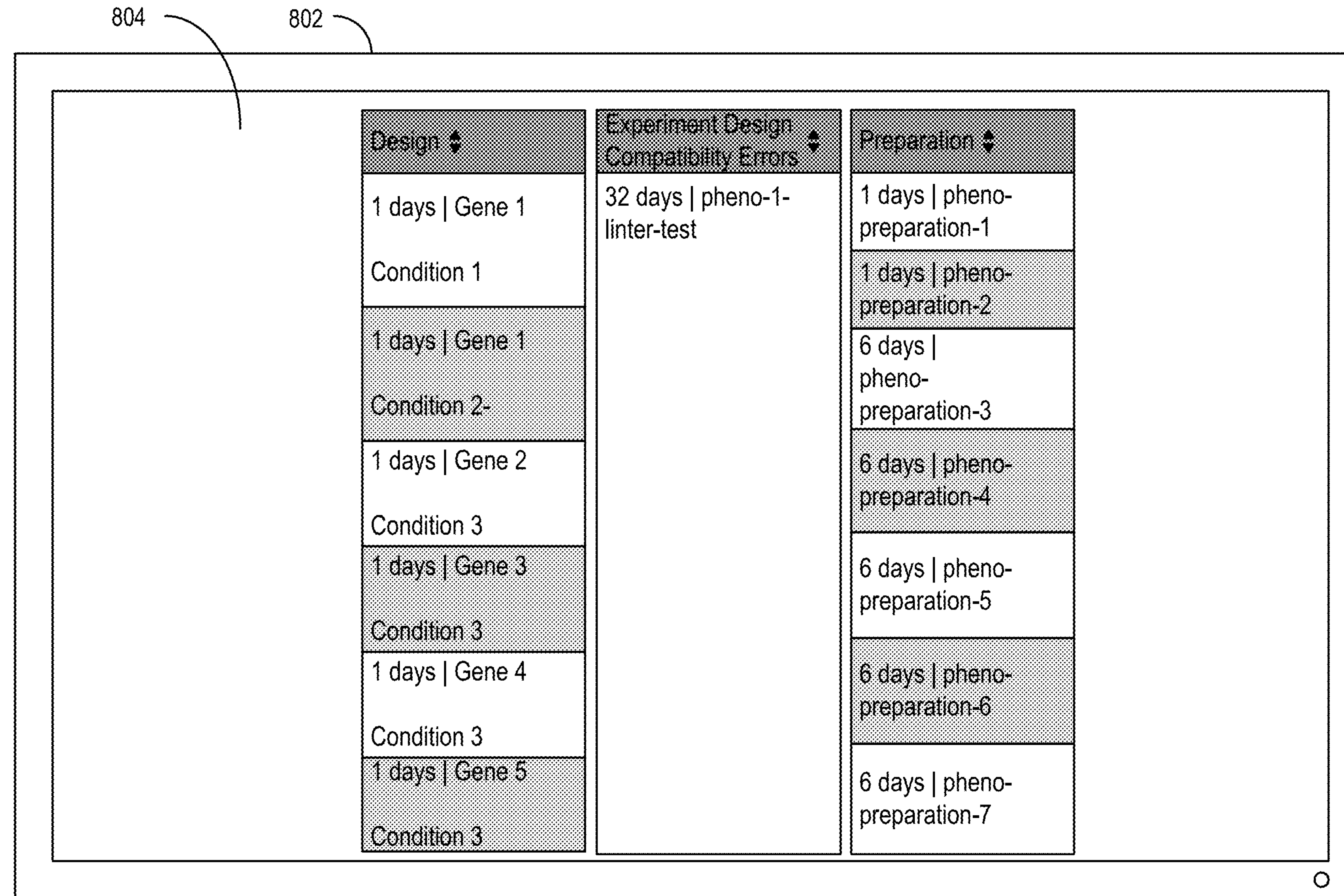
FIG. 8 illustrates an experiment design interface system displaying a graphical user interface with experiment design compatibility errors in accordance with one or more embodiments.

As an example, FIG. 8 illustrates the experiment design interface system 106 displaying a graphical user interface with experiment design compatibility errors. For instance, as shown in FIG. 8, the experiment design interface system 106 can determine one or more experiment design compatibility errors based on comparisons between the conditions in one or more analysis code validation components and an experiment design (as described above) and display the experiment design compatibility errors within a graphical user interface 804 of a client device 802.

FIGS. 1-8, the corresponding text, and the examples provide a number of different systems, methods, and non-transitory computer readable media for generating and displaying compatibility metrics between experiment designs and data analysis models in accordance with one or more implementations. In addition to the foregoing, embodiments can also be described in terms of flowcharts comprising acts for accomplishing a particular result. For example, FIG. 9 illustrates a flowchart of an example sequence of acts in accordance with one or more embodiments.

Figure 9:
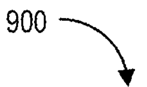
FIG. 9 illustrates an example series of acts for generating and displaying compatibility metrics between experiment designs and data analysis models in accordance with one or more embodiments.
Figure 9:
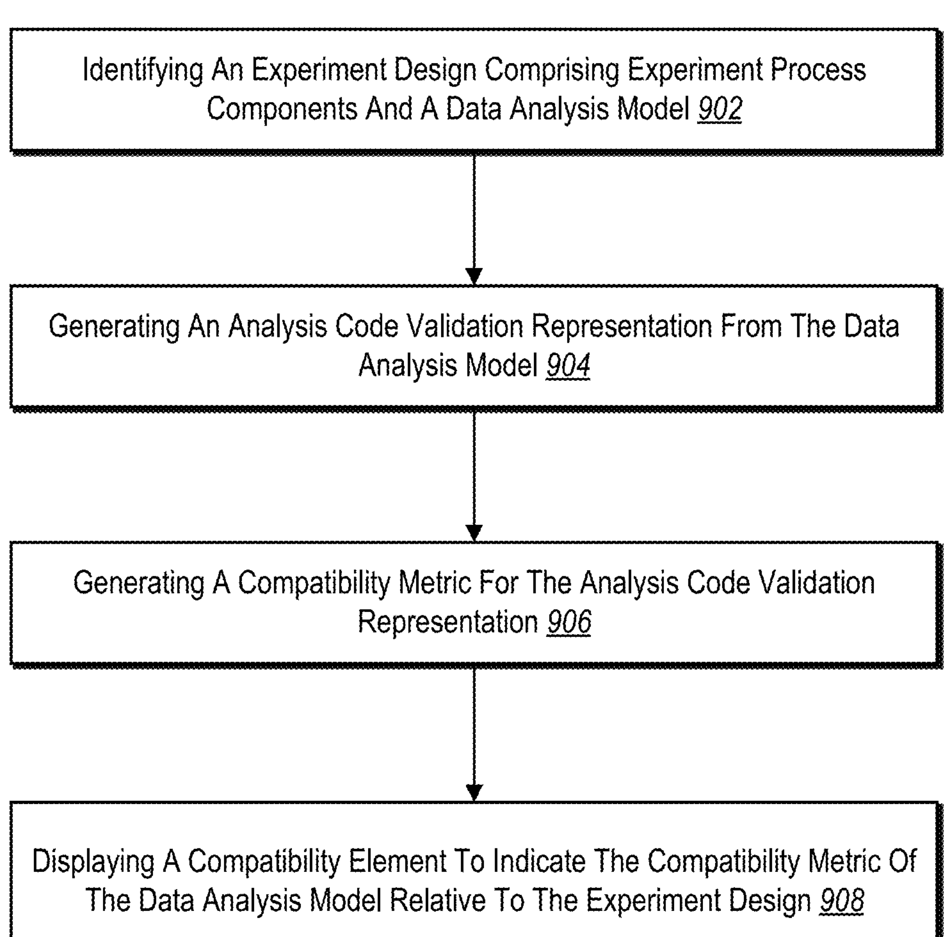

While FIG. 9 illustrates acts according to some embodiments, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9. Additionally, the acts described herein may be repeated or performed in parallel with one another or in parallel with different instances of the same or other similar acts.

FIG. 9 illustrates an example series of acts 900 for generating and displaying compatibility metrics between experiment designs and data analysis models. For example, as shown in FIG. 9, the series of acts 900 can include an act 902 of identifying an experiment design comprising experiment process components and a data analysis model, an act 904 of generating an analysis code validation representation from the data analysis model, an act 906 of generating a compatibility metric for an analysis code validation representation, and an act 908 of displaying a compatibility element to indicate the compatibility metric of the data analysis model relative to the experiment design.

In one or more embodiments, the series of acts 900 can include providing, for display via an experiment design user interface, one or more experiment design selection elements and one or more data analysis model selection elements; in response to a user interaction with the one or more experiment design selection elements and the one or more data analysis model selection elements, identifying an experiment design comprising one or more experiment process components and a data analysis model; generating an analysis code validation representation by extracting one or more analysis code validation components from the data analysis model; generating a compatibility metric by comparing the one or more experiment process components and the analysis code validation representation; and providing, for display within a compatibility graphical user interface, a compatibility element indicating the compatibility metric of the data analysis model relative to the experiment design.

Moreover, in some instances, the series of acts 900 can include generating the analysis code validation representation by generating a directed acyclic graph for the data analysis model comprising at least one analysis model task node, at least one analysis code validation component node from the one or more analysis code validation components, and at least one dependent analysis model task node with an edge from the at least one analysis model task node. Furthermore, the series of acts 900 can include comparing the one or more experiment process components and the analysis code validation representation by comparing the at least one analysis code validation component node, of the at least one analysis model task node, to the one or more experiment process components to generate the compatibility metric.

Additionally, the series of acts 900 can include, upon determining the one or more experiment process components do not satisfy one or more conditions of the at least one analysis code validation component node, generating a negative compatibility metric for the at least one analysis model task node. In addition, the series of acts 900 can include disabling the at least one analysis model task node based on the negative compatibility metric. Furthermore, the series of acts 900 can include executing the experiment design with the at least one analysis model task node disabled and an additional analysis model task node from the analysis code validation representation enabled. In some embodiments, the series of acts 900 can include providing, for display within the compatibility graphical user interface, the compatibility element indicating an analysis task corresponding to the at least one analysis model task node as incompatible relative to the experiment design with a description representing the one or more conditions of the at least one analysis code validation component node.

Additionally, the series of acts 900 can include generating the compatibility metric by generating a positive compatibility metric based on determining the one or more experiment process components satisfy the one or more analysis code validation components from the analysis code validation representation. In addition, the series of acts 900 can include, in response to an additional user interaction with one or more additional experiment design elements within the experiment design user interface, identifying a modified experiment design comprising one or more modified experiment process components. Moreover, the series of acts 900 can include generating an additional compatibility metric by comparing the one or more modified experiment process components and the analysis code validation representation. In addition, the series of acts 900 can include providing, for display within the compatibility graphical user interface, an additional compatibility element indicating the additional compatibility metric of the data analysis model relative to the modified experiment design.

In some cases, the series of acts 900 can include, in response to an additional user interaction with one or more additional experiment design elements and the one or more data analysis model selection elements, identifying an additional experiment design comprising one or more additional experiment process components and the data analysis model comprising the one or more analysis code validation components. Moreover, the series of acts 900 can include generating an additional compatibility metric by comparing the one or more additional experiment process components and the analysis code validation representation comprising the one or more analysis code validation components from the data analysis model. In addition, the series of acts 900 can include providing, for display within the compatibility graphical user interface, an additional compatibility element indicating the additional compatibility metric of the data analysis model relative to the additional experiment design.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
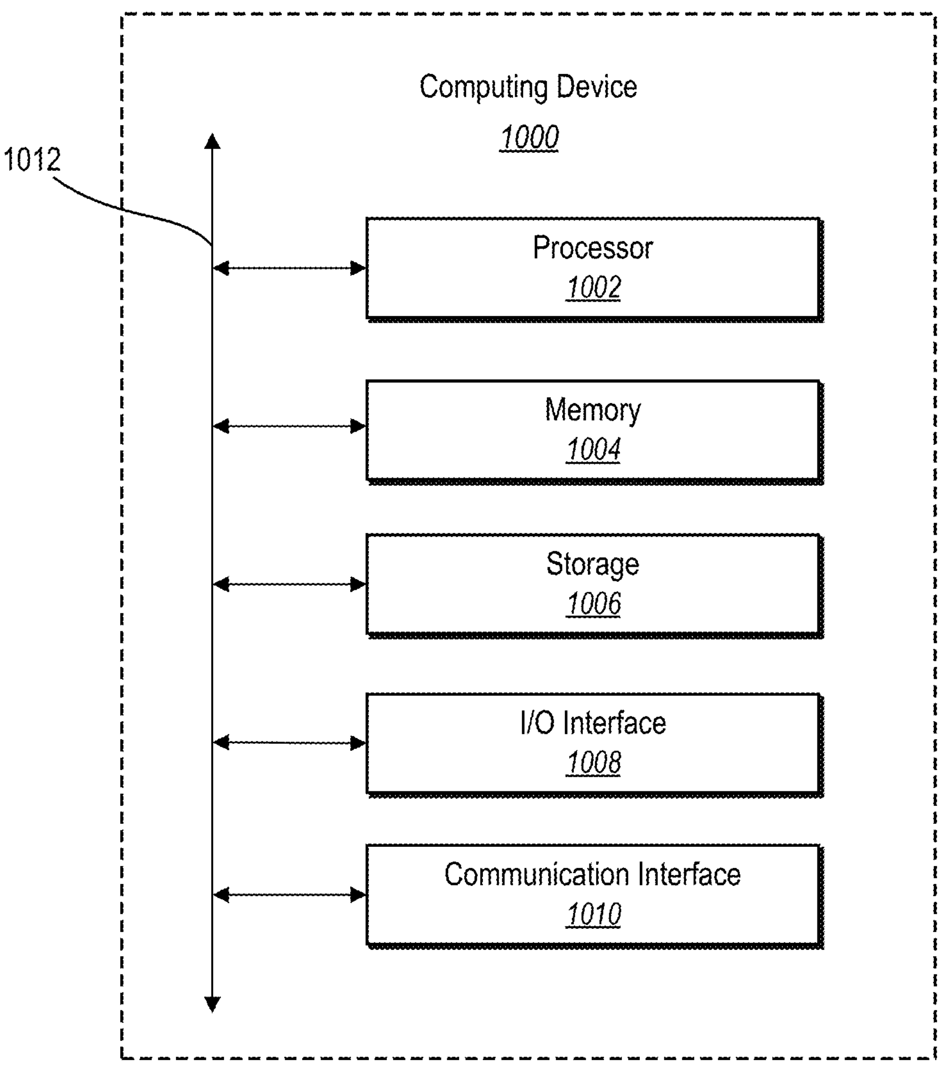
FIG. 10 illustrates a block diagram of an example computing device for implementing one or more embodiments of the present disclosure.

FIG. 10 illustrates a block diagram of exemplary computing device 1000 (e.g., the server(s) 102 and/or the client device(s) 110) that may be configured to perform one or more of the processes described above. One will appreciate that server(s) 102 and/or the client device(s) 110 may comprise one or more computing devices such as computing device 1000. As shown by FIG. 10, computing device 1000 can comprise processor 1002, memory 1004, storage device 1006, I/O interface 1008, and communication interface 1010, which may be communicatively coupled by way of communication infrastructure 1012. While an exemplary computing device 1000 is shown in FIG. 10, the components illustrated in FIG. 10 are not intended to be limiting. Additional or alternative components may be used in other implementations. Furthermore, in certain implementations, computing device 1000 can include fewer components than those shown in FIG. 10. Components of computing device 1000 shown in FIG. 10 will now be described in additional detail.

In particular implementations, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage device 1006 and decode and execute them. In particular implementations, processor 1002 may include one or more internal caches for data, instructions, or addresses. As an example and not by way of limitation, processor 1002 may include one or more instruction caches, one or more data caches, and one or more translation lookaside buffers (TLBs). Instructions in the instruction caches may be copies of instructions in memory 1004 or storage device 1006.

Memory 1004 may be used for storing data, metadata, and programs for execution by the processor(s). Memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1004 may be internal or distributed memory.

Storage device 1006 includes storage for storing data or instructions. As an example and not by way of limitation, storage device 1006 can comprise a non-transitory storage medium described above. Storage device 1006 may include a hard disk drive (HDD), a floppy disk drive, flash memory, an optical disc, a magneto-optical disc, magnetic tape, or a Universal Serial Bus (USB) drive or a combination of two or more of these. Storage device 1006 may include removable or non-removable (or fixed) media, where appropriate. Storage device 1006 may be internal or external to computing device 1000. In particular implementations, storage device 1006 is non-volatile, solid-state memory. In other implementations, Storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1008 allows a user to provide input to, receive output from, and otherwise transfer data to and receive data from computing device 1000. I/O interface 1008 may include a mouse, a keypad or a keyboard, a touch screen, a camera, an optical scanner, network interface, modem, other known I/O devices or a combination of such I/O interfaces. I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1008 is configured to provide graphical data to a display for presentation to a user. The graphical data may be representative of one or more graphical user interfaces and/or any other graphical content as may serve a particular implementation.

Communication interface 1010 can include hardware, software, or both. In any event, communication interface 1010 can provide one or more interfaces for communication (such as, for example, packet-based communication) between computing device 1000 and one or more other computing devices or networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1010 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1012 may include hardware, software, or both that couples components of computing device 1000 to each other. As an example and not by way of limitation, communication infrastructure 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

providing, for display via an experiment design user interface, one or more experiment design selection elements and one or more data analysis model selection elements;

in response to a user interaction with the one or more experiment design selection elements and the one or more data analysis model selection elements, identifying an experiment design comprising one or more experiment process components and a data analysis model;

generating an analysis code validation graph by:

extracting one or more analysis tasks from the data analysis model;

extracting one or more analysis code validation components from the data analysis model; and combining the one or more analysis tasks and the one or more analysis code validation components to generate the analysis code validation graph;

generating an experiment pre-runtime compatibility metric by comparing the one or more experiment process components and the analysis code validation graph; and providing, for display within a compatibility graphical user interface, a compatibility element indicating the experiment pre-runtime compatibility metric of the data analysis model relative to the experiment design representing whether the one or more experiment process components of the experiment design satisfy one or more conditions of the one or more analysis code validation components of the data analysis model.

2. The computer-implemented method of claim 1, further comprising generating the analysis code validation graph by generating a directed acyclic graph for the data analysis model comprising at least one analysis model task node, at least one analysis code validation component node from the one or more analysis code validation components, and at least one dependent analysis model task node with an edge from the at least one analysis model task node.

3. The computer-implemented method of claim 2, further comprising comparing the one or more experiment process components and the analysis code validation graph by comparing the at least one analysis code validation component node, of the at least one analysis model task node, to the one or more experiment process components to generate the experiment pre-runtime compatibility metric.

4. The computer-implemented method of claim 3, further comprising, upon determining the one or more experiment process components do not satisfy one or more conditions of the at least one analysis code validation component node, generating a negative experiment pre-runtime compatibility metric for the at least one analysis model task node.

5. The computer-implemented method of claim 4, further comprising disabling the at least one analysis model task node based on the negative experiment pre-runtime compatibility metric.

6. The computer-implemented method of claim 5, further comprising executing the experiment design with the at least one analysis model task node disabled and an additional analysis model task node from the analysis code validation graph enabled.

7. The computer-implemented method of claim 4, further comprising providing, for display within the compatibility graphical user interface, the compatibility element indicating an analysis task corresponding to the at least one analysis model task node as incompatible relative to the experiment design with a description representing the one or more conditions of the at least one analysis code validation component node.

8. The computer-implemented method of claim 1, further comprising generating the experiment pre-runtime compatibility metric by generating a positive experiment pre-runtime compatibility metric based on determining the one or more experiment process components satisfy the one or more analysis code validation components from the analysis code validation graph.

9. The computer-implemented method of claim 1, further comprising:

in response to a negative experiment pre-runtime compatibility metric, identifying a modified experiment design comprising one or more modified experiment process components based on additional user interactions with one or more additional experiment design elements; and providing, for display within the compatibility graphical user interface, an additional compatibility element indicating an additional experiment pre-runtime compatibility metric of the data analysis model relative to the modified experiment design.

10. A system comprising:

at least one processor; and at least one non-transitory computer-readable storage medium storing instructions that, when executed by the at least one processor, cause the system to:

provide, for display via an experiment design user interface, one or more experiment design selection elements and one or more data analysis model selection elements;

in response to a user interaction with the one or more experiment design selection elements and the one or more data analysis model selection elements, identify an experiment design comprising one or more experiment process components and a data analysis model;

generate an analysis code validation graph by:

extracting one or more analysis tasks from the data analysis model;

extracting one or more analysis code validation components from the data analysis model; and combining the one or more analysis tasks and the one or more analysis code validation components to generate the analysis code validation graph;

generate an experiment pre-runtime compatibility metric by comparing the one or more experiment process components and the analysis code validation graph; and provide, for display within a compatibility graphical user interface, a compatibility element indicating the experiment pre-runtime compatibility metric of the data analysis model relative to the experiment design representing whether the one or more experiment process components of the experiment design satisfy one or more conditions of the one or more analysis code validation components of the data analysis model.

11. The system of claim 10, wherein the instructions cause the system to generate the analysis code validation graph by generating a directed acyclic graph for the data analysis model comprising at least one analysis model task node, at least one analysis code validation component node from the one or more analysis code validation components, and at least one dependent analysis model task node with an edge from the at least one analysis model task node.

12. The system of claim 11, wherein the instructions cause the system to:

compare the one or more experiment process components and the analysis code validation graph by comparing the at least one analysis code validation component node, of the at least one analysis model task node, to the one or more experiment process components to generate the experiment pre-runtime compatibility metric; and upon determining the one or more experiment process components do not satisfy one or more conditions of the at least one analysis code validation component node, generate a negative experiment pre-runtime compatibility metric for the at least one analysis model task node.

13. The system of claim 12, wherein the instructions cause the system to provide, for display within the compatibility graphical user interface, the compatibility element indicating an analysis task corresponding to the at least one analysis model task node as incompatible relative to the experiment design with a description representing the one or more conditions of the at least one analysis code validation component node.

14. The system of claim 10, wherein the instructions cause the system to generate the experiment pre-runtime compatibility metric by generating a positive experiment pre-runtime compatibility metric based on determining the one or more experiment process components satisfy the one or more analysis code validation components from the analysis code validation graph.

15. The system of claim 10, wherein the instructions cause the system to:

in response to a negative experiment pre-runtime compatibility metric, identifying a modified experiment design comprising one or more modified experiment process components based on additional user interactions with one or more additional experiment design elements; and provide, for display within the compatibility graphical user interface, an additional compatibility element indicating an additional experiment pre-runtime compatibility metric of the data analysis model relative to the modified experiment design.

16. A non-transitory computer-readable medium storing instructions that, when executed by at least one processor, cause a computing device to:

provide, for display via an experiment design user interface, one or more experiment design selection elements and one or more data analysis model selection elements;

in response to a user interaction with the one or more experiment design selection elements and the one or more data analysis model selection elements, identify an experiment design comprising one or more experiment process components and a data analysis model;

generate an analysis code validation graph by:

extracting one or more analysis tasks from the data analysis model;

extracting one or more analysis code validation components from the data analysis model; and combining the one or more analysis tasks and the one or more analysis code validation components to generate the analysis code validation graph;

generate an experiment pre-runtime compatibility metric by comparing the one or more experiment process components and the analysis code validation graph; and provide, for display within a compatibility graphical user interface, a compatibility element indicating the experiment pre-runtime compatibility metric of the data analysis model relative to the experiment design representing whether the one or more experiment process components of the experiment design satisfy one or more conditions of the one or more analysis code validation components of the data analysis model.

17. The non-transitory computer-readable medium of claim 16, wherein the instructions cause the computing device to generate the analysis code validation graph by generating a directed acyclic graph for the data analysis model comprising at least one analysis model task node, at least one analysis code validation component node from the one or more analysis code validation components, and at least one dependent analysis model task node with an edge from the at least one analysis model task node.

18. The non-transitory computer-readable medium of claim 16, wherein the instructions cause the computing device to generate the experiment pre-runtime compatibility metric by generating a negative experiment pre-runtime compatibility metric based on determining the one or more experiment process components do not satisfy the one or more analysis code validation components from the analysis code validation graph.

19. The non-transitory computer-readable medium of claim 18, wherein the instructions cause the computing device to:

in response to a negative experiment pre-runtime compatibility metric, identifying a modified experiment design comprising one or more modified experiment process components based on additional user interactions with one or more additional experiment design elements; and providing, for display within the compatibility graphical user interface, an additional compatibility element indicating an additional experiment pre-runtime compatibility metric of the data analysis model relative to the modified experiment design.

20. The non-transitory computer-readable medium of claim 16, wherein the instructions cause the computing device to generate the experiment pre-runtime compatibility metric by generating a positive experiment pre-runtime compatibility metric based on determining the one or more experiment process components satisfy the one or more analysis code validation components from the analysis code validation graph.

* * * * *